(12) United States Patent
Yang et al.

(10) Patent No.: US 11,184,262 B2
(45) Date of Patent: Nov. 23, 2021

(54) BEAM MEASUREMENT PROCESSING METHOD AND DEVICE

(71) Applicant: VIVO MOBILE COMMUNICATION CO., LTD., Dongguan (CN)

(72) Inventors: Yu Yang, Dongguan (CN); Yang Song, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 27 days.

(21) Appl. No.: 16/623,237

(22) PCT Filed: Jun. 12, 2018

(86) PCT No.: PCT/CN2018/090799
§ 371 (c)(1),
(2) Date: Dec. 16, 2019

(87) PCT Pub. No.: WO2018/228366
PCT Pub. Date: Dec. 20, 2018

(65) Prior Publication Data
US 2021/0152447 A1 May 20, 2021

(30) Foreign Application Priority Data

Jun. 16, 2017 (CN) .......................... 201710459813.0

(51) Int. Cl.
*H04L 12/26* (2006.01)
*H04B 7/06* (2006.01)
(Continued)

(52) U.S. Cl.
CPC ........... *H04L 43/08* (2013.01); *H04B 7/0408* (2013.01); *H04B 7/0617* (2013.01); *H04B 7/088* (2013.01); *H04L 5/0048* (2013.01); *H04B 7/0413* (2013.01)

(58) Field of Classification Search
CPC ...... H04B 7/063; H04B 7/0695; H04B 7/088; H04W 16/28; H04W 72/0446
See application file for complete search history.

(56) References Cited

U.S. PATENT DOCUMENTS

| | | | |
|---|---|---|---|
| 2014/0198681 A1 | 7/2014 | Jung et al. | |
| 2017/0055162 A1 | 2/2017 | Takano | |
| 2017/0207845 A1* | 7/2017 | Moon | .................. H04B 7/0695 |

FOREIGN PATENT DOCUMENTS

| | | |
|---|---|---|
| CN | 103891161 A | 6/2014 |
| CN | 104937972 A | 9/2015 |

(Continued)

OTHER PUBLICATIONS

1st Chinese Office Action for Chinese Application No. 201710459813.0, dated Jan. 3, 2020 (Jan. 3, 2020)—10 pages (English translation—13 pages).

(Continued)

*Primary Examiner* — David S Huang
(74) *Attorney, Agent, or Firm* — Culhane Meadows PLLC; Stephen J. Weed

(57) ABSTRACT

A beam measurement processing method and a beam measurement processing device are provided. The beam measurement processing method for a network side device includes: when Beam Pair Link (BPL) quality is measured in a first mode, determining a first completion time at which a beam sweeping for all reception beams has been completed by a User Equipment (UE) corresponding to a current transmission beam, and transmitting a next transmission beam after the first completion time; and/or when the BPL quality is measured in a second mode, determining a second (Continued)

when BPL quality is measured in a first mode, determining a first completion time at which a beam sweeping for all reception beams has been completed by a UE corresponding to a current transmission beam — S104 transmitting a next transmission beam after the first completion time — S105 completion time at which a beam sweeping for all transmission beams has been completed by a network side device corresponding to a current reception beam, and performing a next beam sweeping for all the transmission beams after the second completion time.

20 Claims, 9 Drawing Sheets

(51) Int. Cl.
*H04B 7/0408* (2017.01)
*H04L 5/00* (2006.01)
*H04B 7/08* (2006.01)
*H04B 7/0413* (2017.01)

(56) References Cited

FOREIGN PATENT DOCUMENTS

| | | |
|---|---|---|
| CN | 106162673 A | 11/2016 |
| WO | 2014178642 A1 | 11/2014 |
| WO | 2015186380 A1 | 12/2015 |

OTHER PUBLICATIONS

CATT: "Discussion on CSI-RS for beam management" R1-1707486, 3GPP TSG RAN WG1 Meeting #89, Hangzhou, P.R. China, May 15, 2017, 4 pages.
Chinese Search Report for Chinese Application No. 201710459813. 0, dated Apr. 18, 2019 (Apr. 18, 2019)—6 pages (English translation—4 pages).
ETRI: "Beam sweeping for initial access" R1-166947, 3GPP TSG RAN WG1Meeting #86, Gothenburg, Sweden, Aug. 22, 2016, 4 pages.
Extended European Search Report for European Application No. 18818416.2, dated Apr. 14, 20120(Apr. 14, 2020)—11 pages.
Huawei, HiSilicon: "CSI-RS design for beam management" R1-1706931, 3GPP TSG RAN WG1 Meeting #89, Hangzhou, China, May 15, 2017, 10 pages.
International Search Report and Written Opinion for International Application No. PCT/CN2018/090799, dated Dec. 26, 2019 (Dec. 26, 2019)—9 pages (English translation—6 pages).
Samsung: "Time domain mapping of initial access signals for the multi-beam case," R1-1609108, 3GPP TSG RAN WG1 Meeting #86bis, Lisbon, Portugal, Oct. 10, 2016, 4 pages.
ZTE et al.: "WF on CSI-RS for beam management" R1-1709668, 3GPP TSG RAN WG1 Meeting #89, Hangzhou, China, May 15, 2017, 2 pages.

* cited by examiner

BEAM MEASUREMENT PROCESSING METHOD AND DEVICE

CROSS-REFERENCE TO RELATED APPLICATION

The present application is the U.S. national phase of PCT Application No. PCT/CN2018/090799 filed on Jun. 12, 2018, which claim a priority of the Chinese patent application No. 201710459813.0 filed on Jun. 16, 2017, which is incorporated herein by reference in its entirety.

TECHNICAL FIELD

The present disclosure relates to the field of communication technology, in particular to a beam measurement processing method and a beam measurement processing device.

BACKGROUND

Due to the use of a massive antenna array, it is able for a massive Multiple Input Multiple Output (MIMO) technology to remarkably improve system frequency band utilization and support the access of a large quantity of users. Hence, the massive MIMO technology has been considered by research organizations as one of the most promising physical layer technologies for a next-generation mobile communication system. The massive MIMO technology includes a full-digital beamforming technology and a digital-analog hybrid beamforming technology. For the digital-analog hybrid beamforming technology, a beamforming stage is added to a Radio Frequency (RF) signal at a frontend proximate to an antenna system on the basis of conventional digital-domain beamforming. As compared with the full-digital beamforming technology, it is able for the analog beamforming technology to roughly match a transmitted signal with a channel in a relatively simple manner, thereby to make a compromise between performance and complexity. Hence, the analog beamforming technology is applicable to a system with a high frequency band and a large bandwidth or with a large quantity of antennae.

For the analog beamforming technology, analog beams are transmitted at a full bandwidth. In addition, the analog beams are merely transmitted in a time-division multiplexing (TDM) manner by an array element in each polarization direction on each high-frequency antenna array panel. A beamforming weight value of the analog beam is achieved through adjusting a parameter of such a device as an RF frontend phase shifter. Usually, analog beamforming vectors are trained in a polling manner. In other words, configuration information about beam measurement is issued by a network side device at first, and next training signals (i.e., transmission beams) are transmitted sequentially in a TDM manner at specified time points by the array elements on each antenna panel in each polarization direction. After measuring the transmission beams and reception beams supported by a User Equipment (UE), the UE transmits an optimum beam identity (ID) and quality (e.g., reception power) of a beam pair link to which an optimum beam belongs to the network side device, so that the network side device transmits data subsequently through the optimum analog transmission beam.

During the beam management in the above-mentioned measurement process, an optimum transmission (Tx)/reception (Rx) beam pair link (BPL) may be measured through Tx beam sweeping and Rx beam sweeping. During the Tx/Rx beam sweeping, a time unit is defined. Each time unit corresponds to one or more Orthogonal Frequency Division Multiplexing (OFDM) symbol, i.e., an integral multiple of OFDM symbols. Each time unit may be divided into a plurality of sub-time units. Usually, a commonly-used measurement mode includes the following modes.

Mode 1: the transmission beams in each time unit remain unchanged, and the transmission beams are different in different time units (for clarification, this mode may be referred to as Rx beam sweeping mode hereinafter).

Mode 2: the transmission beams are different in different sub-time units of each time unit, and the transmission beams are the same in different time units (for clarification, this mode may be referred to as Tx beam sweeping mode hereinafter).

Mode 3: the transmission beams remain unchanged in one time unit, and the transmission beams are different in different sub-time units of the other time unit.

However, it is found that, in a conventional measurement mode, it is necessary for the UE to measure, in one time unit, the BPL for one Tx beam and all the Rx beams or the BPL for one Rx beam and all the Tx beams. During the measurement, a measurement capability of the UE is not taken into consideration, i.e., the maximum measurement times capable of being supported by the UE (also called as mobile terminal) on each OFDM symbol. This may probably lead to a waste of time resources for the beam measurement.

SUMMARY

An object of the present disclosure is to provide a beam measurement processing method and a beam measurement processing device, so as to solve the above-mentioned problems.

In one aspect, the present disclosure provides in some embodiments a beam measurement processing method, including: when BPL quality is measured in a first mode, determining a first completion time at which a beam sweeping for all reception beams has been completed by a UE corresponding to a current transmission beam, and transmitting a next transmission beam after the first completion time; and/or when the BPL quality is measured in a second mode, determining a second completion time at which a beam sweeping for all transmission beams has been completed by a network side device corresponding to a current reception beam, and performing a next beam sweeping for all the transmission beams after the second completion time.

In another aspect, the present disclosure provides in some embodiments a beam measurement processing method, including: when BPL quality is measured in a first mode, determining a first completion time at which a beam sweeping for all reception beams has been completed by a UE corresponding to a current transmission beam, and performing a next beam sweeping for all the reception beams after the first completion time; and/or when the BPL quality is measured in a second mode, determining a second completion time at which a beam sweeping for all transmission beams has been completed by a network side device corresponding to a current reception beam, and switching to a next reception beam for measurement after the second completion time.

In yet another aspect, the present disclosure provides in some embodiments a beam measurement processing device, including a first time determination unit and a transmission beam control unit. The first time determination unit is configured to, when BPL quality is measured in a first mode, determine a first completion time at which a beam sweeping for all reception beams has been completed by a UE corresponding to a current transmission beam, and the transmission beam control unit is configured to transmit a next transmission beam after the first completion time; and/or the first time determination unit is configured to, when the BPL quality is measured in a second mode, determine a second completion time at which a beam sweeping for all transmission beams has been completed by a network side device corresponding to a current reception beam, and the transmission beam control unit is configured to perform a next beam sweeping for all transmission beams after the second completion time.

In still yet another aspect, the present disclosure provides in some embodiments a beam measurement processing device, including a second time determination unit and a reception beam control unit. The second time determination unit is configured to, when BPL quality is measured in a first mode, determine a first completion time at which a beam sweeping for all reception beams has been completed by a UE corresponding to a current transmission beam, and the reception beam control unit is configured to perform a next beam sweeping for all reception beams after the first completion time; and/or the second time determination unit is configured to, when the BPL quality is measured in a second mode, determine a second completion time at which a beam sweeping for all transmission beams has been completed by a network side device corresponding to a current reception beam, and the reception beam control unit is configured to measure a next reception beam after the second completion time.

In still yet another aspect, the present disclosure provides in some embodiments a network side device, including a processor, a memory, and a computer program stored in the memory and executed by the processor. The processor is configured to execute the computer program so as to implement the above-mentioned beam measurement processing method.

In still yet another aspect, the present disclosure provides in some embodiments a computer-readable storage medium storing therein a computer program. The computer program is executed by a processor so as to implement the above-mentioned beam measurement processing method.

In still yet another aspect, the present disclosure provides in some embodiments a UE, including a processor, a memory, and a computer program stored in the memory and executed by the processor. The processor is configured to execute the computer program so as to implement the above-mentioned beam measurement processing method.

In still yet another aspect, the present disclosure provides in some embodiments a computer-readable storage medium storing therein a computer program. The computer program is executed by a processor so as to implement the above-mentioned beam measurement processing method.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure. The expression "and/or" involved in the embodiments of the present disclosure represents at least one of listed items.

In order to differentiate a measurement mode in the embodiments of the present disclosure from that in the related art, the measurement mode in the related art will be described hereinafter.

At first, a measurement mode 1 and a measurement mode 2 in the background will be illustratively described hereinafter. A measurement mode 3 is a combination of the measurement modes 1 and 2, and thus will not be particularly defined herein.

It is presumed that there are four Tx beams for a network side device and two Rx beams for a UE.

Figure 1:
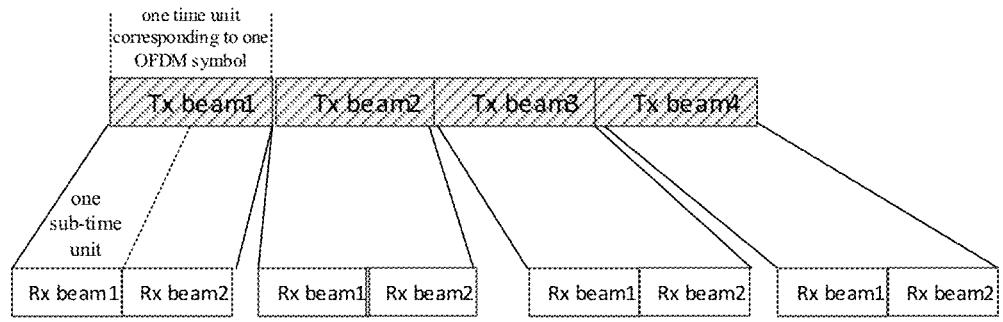
FIG. 1 is a schematic view showing beam training in an Rx beam sweeping mode in the related art.

Referring to FIG. 1, when an Rx beam sweeping mode in the measurement mode 1 is adopted, each Tx beam may occupy one time unit, i.e., totally four time units may be required. Each time unit may be divided into two sub-time units corresponding to two Rx beams respectively. The UE may measure BPL quality for one Tx beam and all the Rx beams (i.e., Rx beam 1 and Rx beam 2) within one time unit, so it may measure the BPL quality for all the Tx beams (Tx beam 1, Tx beam 2, Tx beam 3 and Tx beam 4) and all the Rx beams within the four time units.

Figure 2:
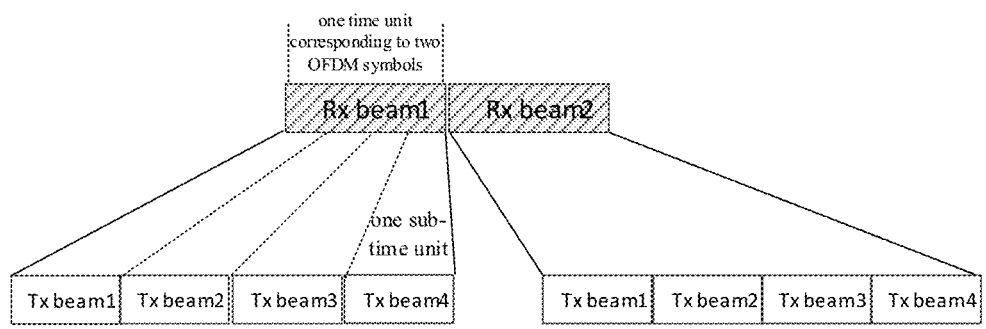
FIG. 2 is a schematic view showing the beam training in a Tx beam sweeping mode in the related art.

Referring to FIG. 2, when a Tx beam sweeping mode in the measurement mode 2 is adopted, each Rx beam may occupy one time unit, i.e., totally two time units may be required. Each time unit may be divided into four sub-time units corresponding to four Tx beams respectively. The UE may measure the BPL quality for all the Tx beams and one Rx beams within one time unit, so it may measure the BPL quality for all the Tx beams and all the Rx beams within the two time units.

In each of the two measurement modes in FIGS. 1 and 2, the quantity of OFDM symbols occupied by each time unit may be different. For example, when the UE is capable of performing the beam measurement twice in one OFDM symbol through such a technique as Interleaved Frequency Division Multiple Access (IFDMA) or large subcarrier spacing, each time unit in FIG. 1 may occupy one OFDM symbol, and totally four time units may be required, i.e., totally four OFDM symbols may be required. Each time unit may be divided into two sub-time units, and each sub-time unit may have a length equal to a half of the OFDM symbol. In addition, each time unit in FIG. 2 may occupy two OFDM symbols, and totally two time units may be required, i.e., totally four OFDM symbols may be required. Each time unit may be divided into four sub-time units, and each sub-time unit may have a length equal to a half of the OFDM symbol.

In FIGS. 1 and 2, although without any waste of sub-time units, in actual use, there may probably exist the following problems for the measurement modes in the related art.

Figure 3:
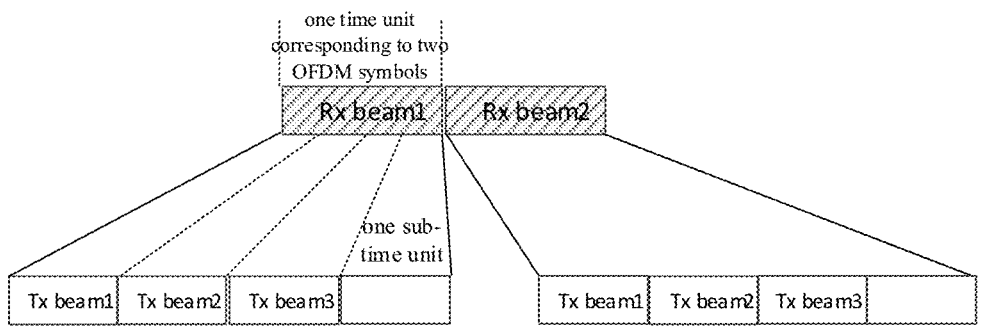
FIG. 3 is another schematic view showing the beam training in the Rx beam sweeping mode in the related art.

In a first situation as shown in FIG. 3, there are three Tx beams for the network side device and two Rx beams for the UE, the Tx beam sweeping mode in the measurement mode 2 is adopted, and the UE is capable of performing the beam measurement twice in each OFDM symbol. Because the UE needs to measure the BPL quality for three Rx beams and three Tx beams within each time unit in the measurement mode 2, at least two OFDM symbols are required so as to complete the measurement within one time unit. Hence, the network side device may, through a Channel State Indication Reference Signal (CSI-RS) configuration message, notify the UE that one time unit occupies two OFDM symbols and each time unit includes four sub-time units.

At this time, the UE may measure Tx beam 1+Rx beam 1 and Tx beam 2+Rx beam 1 in a first OFDM symbol, and measure Tx beam 3+Rx beam 1 in a second OFDM symbol. As shown in FIG. 3, one remaining sub-time unit of each time unit may be in an idle state. As defined in the measurement mode 2, the Rx beams within each time unit may remain unchanged. Hence, even if a current Rx beam and all the Tx beams have been measured before a current OFDM symbol is ended (i.e., the BPL quality corresponding to one time unit has been measured), the next BPL quality may be measured when a next OFDM arrives. This results in a waste of time resources.

Figure 4:
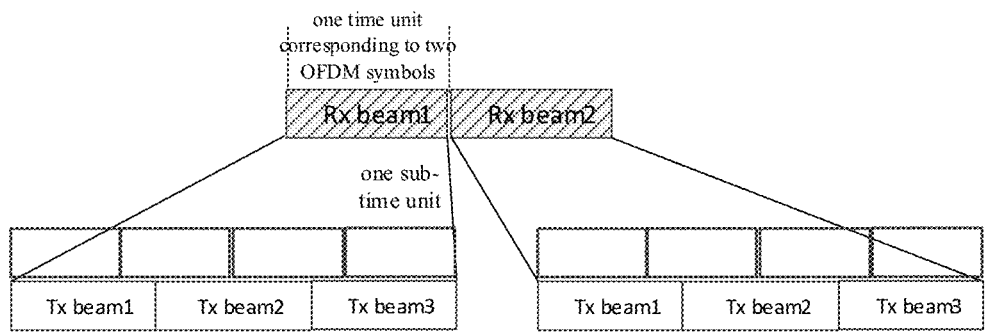
FIG. 4 is another schematic view showing the beam training in the Tx beam sweeping mode in the related art.

In a second situation as shown in FIG. 4, the quantity of the Tx beams, the quantity of the Rx beams, the sweeping mode, and the times of beam measurement capable of being performed by the UE in one OFDM symbol may be the same as those in FIG. 3. FIG. 4 differs from FIG. 3 merely in that, although each time unit should have been divided into four sub-time units, one of the time units may be divided into three sub-time units in accordance with the quantity of the Tx beams. At this time, although without any idle sub-time unit, a time period of beam training may be prolonged for each sub-time unit, which also results in a waste of time resources.

Figure 5:
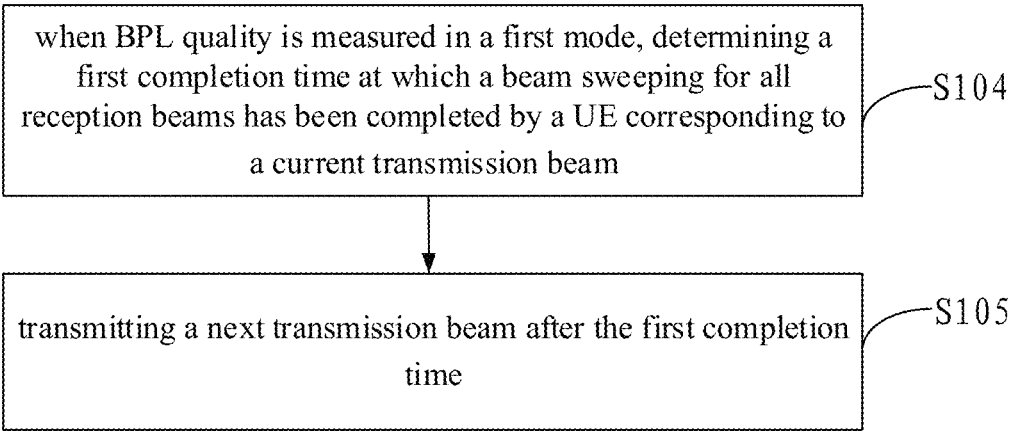
FIG. 5 is a flow chart of a beam measurement processing method according to one embodiment of the present disclosure.
Figure 6:
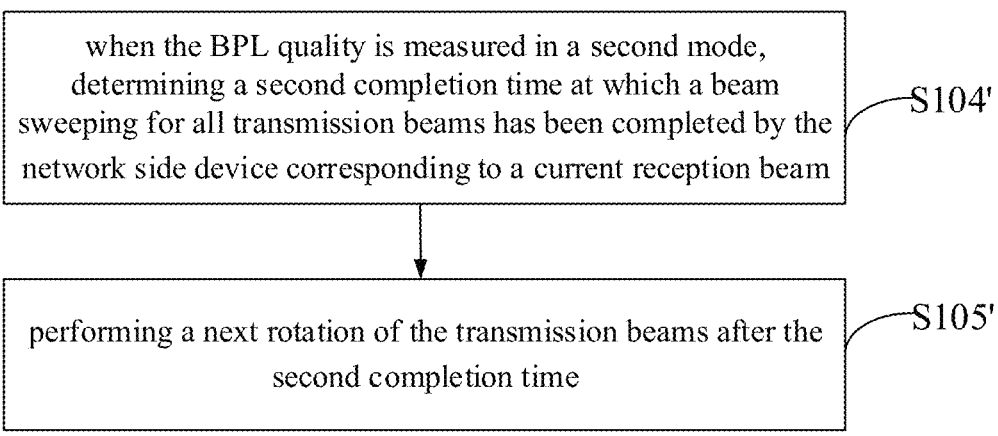
FIG. 6 is another flow chart of the beam measurement processing method according to one embodiment of the present disclosure.

Based on the above, the present disclosure provides in some embodiments a beam measurement processing method which, as shown in FIGS. 5 and 6, includes the following steps.

S104: when BPL quality is measured in a first mode, determining a first completion time at which a beam sweeping for all reception beams has been completed by a UE corresponding to a current transmission beam.

Here, the measuring the BPL quality in the first mode may include: before switching the transmission beam each time, performing the beam sweeping for all the reception beams, and measuring the link quality of each beam pair; and after the completion of the BPL quality measurement, switching to a next transmission beam and performing a next beam sweeping for all the reception beams, until the link quality of all beam pairs formed by each transmission beam and each reception beam has been measured. In other words, the BPL quality measurement in the first mode is a measurement mode in which a fixed Tx beam is transmitted repeatedly by a network side device and an Rx beam sweeping operation is performed by the UE within each time unit (it may refer to the measurement mode in FIG. 1).

Here, when the beam sweeping for all the reception beams has been completed by the UE corresponding to the current transmission beam, it means that the Tx beam is used to transmit repeatedly in a time domain and the Rx beams is used to receive in a beam sweeping manner. UE may measure the link quality of each beam pair formed by the Tx beam and each Rx beam.

In addition, the first completion time may be an ending time or an intermediate time of one OFDM symbol, i.e., the first completion time may be determined according to the practical measurement.

S105: transmitting a next transmission beam after the first completion time.

Here, the transmitting the next transmission beam after the first completion time may include transmitting the next transmission beam immediately after the first completion time, or transmitting the next transmission beam over a time period after the first completion time. For example, due to the influence caused by an RF element, it may take a certain time period for the network side device to be switched from one transmission beam to another transmission beam. Hence, the network side device needs to transmit the next transmission beam over a switching time period after the first completion time. Of course, the switching time period may be set artificially, which will not be particularly defined herein.

S104': when the BPL quality is measured in a second mode, determining a second completion time at which a beam sweeping for all transmission beams has been completed by the network side device corresponding to a current reception beam.

Here, the measuring the BPL quality in the second mode may include: before switching the reception beam each time, performing the beam sweeping for all the transmission beams, and measuring the link quality of each beam pair; and after the completion of the BPL quality measurement, switching to a next reception beam and performing a next beam sweeping for all the transmission beams, until the link quality of all beam pairs formed by each transmission beam and each reception beam has been measured. In other words, the BPL quality measurement in the second mode is a measurement mode in which a fixed Rx beam is used to receive repeatedly by the UE and a Tx beam sweeping operation is performed by the network side device within each time unit (it may refer to the measurement mode in FIG. 2).

S105': performing a next beam sweeping for all the transmission beams after the second completion time.

Here, the performing the next beam sweeping for all transmission beams may include transmitting the transmission beams in turn. At this time, the UE may merely measure the link quality of a beam pair formed by one reception beam and each transmission beam. In addition, similar to S102, the performing the beam sweeping for all the transmission beams after the second completion time may include transmitting the transmission beams immediately after the second completion time, or transmitting the transmission beams over a time period after the second completion time, which will not be particularly defined herein.

Here, the second completion time may be similar to the first completion time, i.e., it may be an ending time or an intermediate time of one OFDM symbol. The second completion time may be determined according to the practical measurement.

According to the beam measurement processing method in the embodiments of the present disclosure, the network side device (e.g., a base station) may transmit the next transmission beam after the completion of a beam sweeping for all the reception beams or perform the next beam sweeping for all the transmission beams after a beam sweeping for all the transmission beams. In this regard, after one time unit has been completed and before an ending time of a current OFDM symbol, it is able for the network side device to directly measure the beam within a next time unit corresponding to a non-integral multiple of OFDM symbols, without any necessity to wait for the ending of the OFDM symbol, i.e., without any necessity to meet such a condition that one time unit must occupy an integral multiple of OFDM symbols. As a result, it is able to make full use of a maximum measurement capability of the UE, shorten a time period for the entire beam measurement to the greatest content within the capacity of the UE, and save time resources, thereby to provide more resources for the data transmission.

It should be appreciated that, the above method is mainly provided for downlink beam management, because the transmission beam is just a transmission beam from the network side device and the reception beam is just a reception beam received by the UE, which will not be particularly defined hereinafter.

Based on the above, prior to measuring the BPL quality, the method may further include the following steps.

S101: determining the quantity of the transmission beams and the quantity of the reception beams, and determining a current transmission beam in accordance with the quantity of the transmission beams.

In actual use, the quantity of the Tx beams is known to the network side device, so the network side device may select the Tx beam to be measured currently merely in accordance with the quantity of the Tx beams.

Here, the quantity of the Rx beams may be determined in accordance with the quantity of the Rx beams supported and reported by the UE. To be specific, the quantity of the Rx beams determined in S101 may be smaller than or equal to the quantity of the Rx beams supported by the UE. When the quantity of the Rx beams determined in S101 is smaller than the quantity of the Rx beams supported by the UE, it is merely necessary to measure several Rx beams this time, and when the quantity of the Rx beams determined in S101 is equal to the quantity of the Rx beams supported by the UE, it is necessary to measure all the Rx beams this time.

S102: determining symbol partition information in accordance with a maximum quantity of time partition for the UE. The maximum quantity of time partition for the UE may refer to the maximum quantity of time partition for the OFDM symbol capable of being supported by the UE when a predetermined condition is met. The predetermined condition may include that the UE is capable of completing at least one BPL quality measurement within each time partition. The symbol partition information may include the quantity of time partition or a time length of each time partition to be divided within one OFDM symbol.

Figure 7:
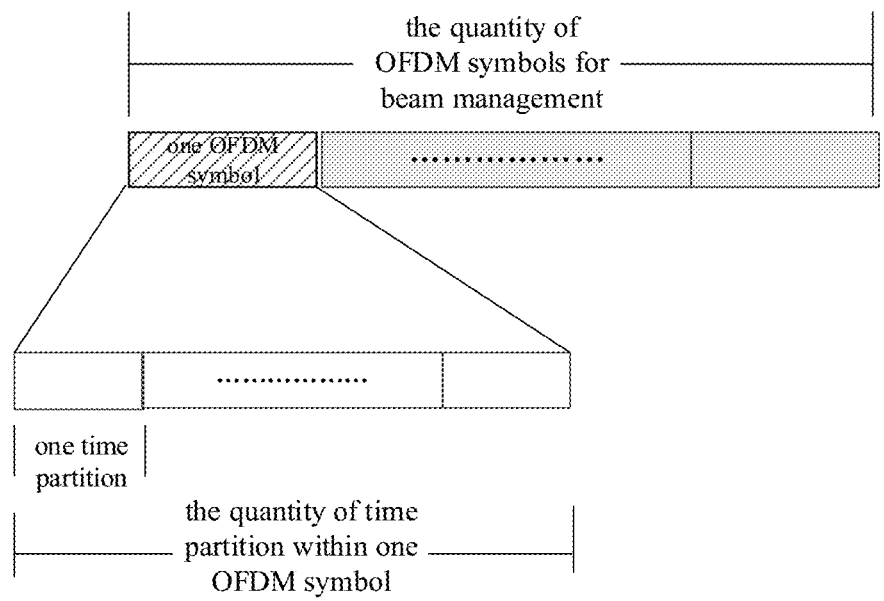
FIG. 7 is a schematic view showing a beam management method according to one embodiment of the present disclosure.

Here, the maximum quantity of time partition for the UE actually reflects a maximum capability of the UE. It is easy to understand that, the OFDM symbols of a same type may have a constant time length, so the maximum quantity of time partition for the OFDM symbol capable of being supported by the UE may also be described as maximum measurement times capable of being performed by the UE within one OFDM symbol, also represented by the number of symbol partition within each OFDM symbol. Of course, any other description modes may also be applied, as long as time partition within one OFDM symbol in such a manner is used to reflect a measurement capability of the UE in an equivalent way as the maximum quantity of time partition within the OFDM symbol mentioned in the embodiments of the present disclosure. Similarly, as shown in FIG. 7, the time length of the time partition in S102 may also be described as a time length of the measurement performed by the UE each time, or a time length of each sub-time unit, i.e., these concepts are equivalent and substantially the same.

S103: transmitting CSI-RS configuration information to the UE. The CSI-RS configuration information may be used to indicate the quantity of the transmission beams, the quantity of the reception beams and the symbol partition information.

Here, "the CSI-RS configuration information is used to indicate the quantity of the transmission beams, the quantity of the reception beams and the symbol partition information" may be understood as that the CSI-RS configuration information is used to enable the UE to acquire these parameters. These parameters may be acquired by the UE in various ways. To be specific, the CSI-RS configuration information may directly include a value of the quantity of the Tx beams, a value of the quantity of the Rx beams, and a value of the beam measurement times or a value of each beam measurement within one OFDM symbol, so that the UE may directly extract the values from the CSI-RS configuration information to acquire these parameters. In addition, the CSI-RS configuration information may further include identification information about these parameters. Upon the receipt of the identification information, the UE may acquire these parameters in accordance with a correspondence between the identification information and the parameters pre-agreed with the network side device. Further, there may exist a plurality of pieces of identification information, and each piece of identification information may correspond to one or more parameters. Also, one piece of identification information may correspond to all the parameters, which will not be particularly defined herein.

S104 may include S1041 of determining the first completion time at which the beam sweeping for all reception beams has been completed by the UE corresponding to the current transmission beam in accordance with the symbol partition information and the quantity of the reception beams. In other words, the network side device may acquire a time for one measurement operation performed by the UE in accordance with the symbol partition information, and acquire a time for one beam sweeping for all reception beams in accordance with the quantity of the reception beams, so as to determine the first completion time at which the beam sweeping for all reception beams has been completed.

S104' may include S1041' of determining the second completion time at which the beam sweeping for all transmission beams has been completed by the network side device corresponding to the current reception beam in accordance with the symbol partition information and the quantity of the transmission beams. In other words, the network side device may acquire the time for one measurement operation performed by the UE in accordance with the symbol partition information, and acquire a time for one beam sweeping for all transmission beams in accordance with the quantity of the transmission beams, so as to determine the second completion time at which the beam sweeping for all transmission beams has been completed.

In the embodiments of the present disclosure, the network side device may configure the measurement configuration parameters according to different measurement requirements, and issue the configuration parameters to the UE, so as to enable the UE to cooperate with the network side device for the measurement. In addition, after one time unit and before the ending time of the OFDM symbol in which the time unit is located, the network side device may directly perform the beam measurement within a next time unit, without any necessity to wait for the ending of the current OFDM symbol. As a result, it is able to make full use of the maximum measurement capability of the UE, shorten the time period for the entire beam measurement to the greatest content within the capacity of the UE, and save the time resources, thereby to provide more resources for the data transmission.

During the implementation, when the CSI-RS configuration information is transmitted in S103, the CSI-RS configuration information may include at least one of the symbol partition information, the quantity of the transmission beams, the quantity of the reception beams, CSI-RS resource configuration related information, CSI-RS resource quantity related information, time-domain repetition times associated with each CSI-RS resource, a total quantity of OFDM symbols, a measurement mode indicator, the quantity of symbol intervals, a CSI-RS period, beam selection mode indication information, BPL quality measurement activation information, and the quantity of CSI-RS resources or CSI-RS ports supported within each time partition.

Based on the above information, the UE may directly or indirectly acquire the quantity of the Tx beams, the quantity of the Rx beams and the symbol partition information. Through various combinations of the parameters, it is able for the UE to acquire the quantity of the beams and the symbol partition information in a more flexible manner.

How to acquire the quantity of the Tx beams, the quantity of the Rx beams and the symbol partition information by the UE will be described hereinafter. Of course, some other parameters for controlling the beam training, e.g., the measurement mode indicator indicating whether the Tx beam sweeping mode or the Rx beam sweeping mode is performed at first or the CSI-RS period indicating a beam measurement period, may also be included. Correspondingly, the UE may also control the BPL quality measurement in accordance with these parameters, and a specific control mode will be described in details hereinafter.

The following examples will be provided so as to describe how to save the time resources through the method in the embodiments of the present disclosure.

Example 1

There are four Tx beams and two Rx beams. The UE is capable of supporting four time partition within each OFDM symbol, i.e., the UE is capable of performing the measurement for four times within each OFDM symbol.

(1) Beam Measurement Modes in the Related Art

There are two beam measurement modes in the related art. In a first mode, the CSI-RS configuration information issued by the network side device may include: the quantity of CSI-RS resources (4); time-domain repetition times associated with each CSI-RS resource (2); a CSI-RS Resource Element (RE) pattern, the quantity of CSI-RS antenna ports and a CSI-RS period; a beam sweeping mode in the measurement mode 1 (i.e., the Rx beam sweeping mode is performed at first); the quantity of time units (4); a length of each time unit (e.g. one symbol); and the quantity of sub-time units within each time unit (4).

Figure 8:
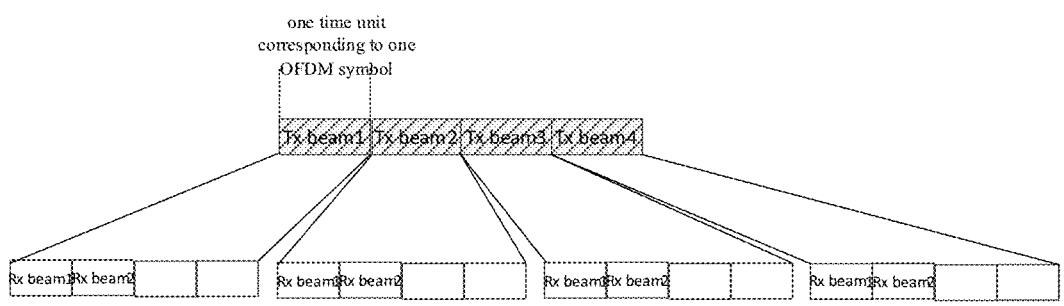
FIG. 8 is yet another schematic view showing the beam training in the Rx beam sweeping mode in the related art.

As shown in FIG. 8, upon the receipt of the configuration information, the UE may cooperate with the network side device to perform the beam measurement. The Rx beam sweeping mode is adopted at first, so it is merely necessary to perform the beam measurement twice within one time unit so as to measure a current Tx beam and all the Rx beams. For example, merely Tx beam 1+Rx beam 1 and Tx beam 1+Rx beam 2 may be measured within a first time unit. The UE is capable of supporting the measurement within each OFDM symbol for four times, and one time unit at least corresponds to one OFDM symbol in the conventional measurement mode, so one time unit may occupy one OFDM symbol herein. Apparently in FIG. 8, within one OFDM symbol, the quantity of the time partition capable of being supported by the UE (i.e., the measurement times), i.e., 4, is greater than the measurement times required to be performed within one time unit, i.e., 2, so there may exist two sub-time units in an idle state, resulting in a waste of the time resources.

In a second mode, the CSI-RS configuration information may include: the quantity of CSI-RS resources (4); time-domain repetition times associated with each CSI-RS resource (2); a CSI-RS RE pattern, the quantity of CSI-RS antenna ports and a CSI-RS period; a beam sweeping mode in the measurement mode 1; the quantity of time units (4); a length of each time unit (one symbol); and the quantity of sub-time units within each time unit (2).

Figure 9:
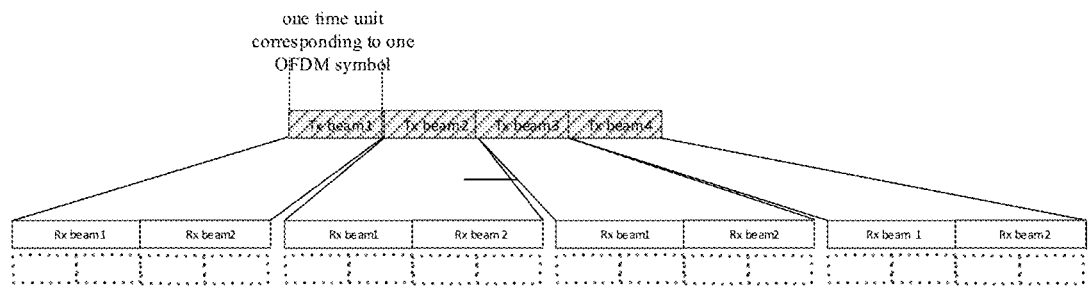
FIG. 9 is still yet another schematic view showing the beam training in the Rx beam sweeping mode in the related art.

As shown in FIG. 9, in this mode, the UE should have supported four time partition within each symbol, but merely two time partition are provided in accordance with the quantity of the Rx beams. At this time, although without any sub-time unit in the idle state, a measurement time period may be prolonged inevitably due to the presence of two sub-time units rather than four sub-time units within each symbol, so a total time period for training all the beams may be prolonged too, also resulting in a waste of time resources.

(2) Beam Measurement Mode in the Embodiments of the Present Disclosure

There may exist four Tx beams and two Rx beams, so it is necessary to perform the measurement for eight times. The UE is capable of supporting the measurement for four times within each OFDM symbol, so it is merely necessary to provide two OFDM symbols for the measurement of all the beams. In addition, in this example, the UE may pre-agree with the network side device that a Tx beam is used to transmit repeatedly and an Rx beam sweeping operation is performed, i.e., the Rx beam sweeping mode is adopted at first. The CSI-RS configuration information issued by the network side device may include: the quantity of transmission beams (4); the quantity of reception beams (2); a CSI-RS Resource Element (RE) pattern, the quantity of CSI-RS antenna ports and a CSI-RS period; the quantity of OFDM symbols (2); the quantity of time partition within each OFDM symbol (4); and the quantity of CSI-RS resources or CSI-RS ports supported within each time partition for each OFDM symbol (default).

How to acquire requisite parameters for the beam measurement by the UE after the acquisition of the configuration information will be described hereinafter in more details, and the description herein may focus on how to shorten a training time period for the beams as possible by the UE and the network side device through the method in the embodiments of the present disclosure.

Figure 10:
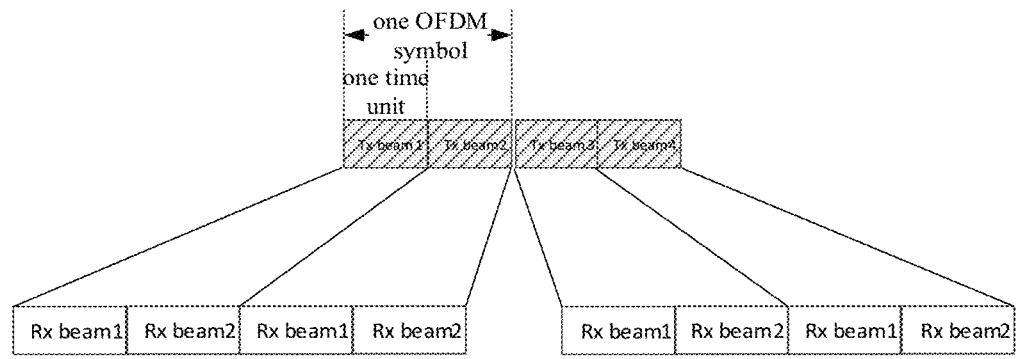
FIG. 10 is a schematic view showing the beam training in the Rx beam sweeping mode according to one embodiment of the present disclosure.

As shown in FIG. 10, after the sweeping operation on Rx beam 1 and Rx beam 2 has been completed, the network side device may directly transmit Tx beam 2 after the completion time, i.e., directly enter a second time unit. Here, the time unit may has a time length equal to ½ of one OFDM symbol. The subsequence process may be performed in a similar way, until the sweeping operation on Tx beam 4 and all the Rx beams has been completed.

Through comparing FIGS. 8-9 with FIG. 10, the beam measurement mode in the embodiments of the present disclosure mainly differs from that in the related art in that, an integral multiple of OFDM symbols are merely occupied by one time unit in the related art. Taking the Rx beam sweeping mode as an example, when the quantity of the Rx beams is not an integral multiple of the quantity of the maximum measurement times capable of being performed by the UE within one OFDM symbol (here, the quantity of the Rx beams is 2 and the quantity of the maximum measurement times is 4), the network side device may merely switch the Tx beam at a time where the integral multiple of OFDM symbols are located, because it is impossible for the network side device to switch to a next Tx beams within each time unit when the sweeping operation on all the Rx beams has been completed, and merely an integral multiple of OFDM symbols are capable of being occupied by each time unit. On this premise, no matter whether the beam measurement is performed using the maximum capability of the UE in FIG. 8 or through prolonging a time period of each measurement in FIG. 9, some time resources may be wasted. When the measurement on all the beams has been completed, totally four OFDM symbols are required.

However, in the embodiments of the present disclosure, each time unit may occupy an integral multiple of OFDM symbols or may occupy an non-integral multiple of OFDM symbols. As shown in FIG. 10, one time unit may occupy ½ of one OFDM symbol, so after the beam measurement has been performed within one time unit, the network side device may switch to a next Tx beam within the current OFDM symbol. When the beam measurement on all the beams has been completed, totally two OFDM symbols are required. As a result, it is able to make full use of the measurement capability of the UE, and shorten the entire beam training time period. The method in the embodiments of the present disclosure may also be applied to the Tx beam sweeping mode in a similar manner, which will thus not be particularly defined herein.

Example 2

There are three Tx beams and four Rx beams. The UE is capable of supporting six time partition within each symbol.

(1) Beam Measurement Mode in the Related Art

In this example, merely a conventional measurement mode where a time period of each beam measurement is not prolonged may be listed. In this mode, the CSI-RS configuration information issued by the network side device may include: the quantity of CSI-RS resources (3); time-domain repetition times associated with each CSI-RS resource (4); a CSI-RS Resource Element (RE) pattern, the quantity of CSI-RS antenna ports and a CSI-RS period; a beam sweeping mode in the measurement mode 1; the quantity of time units (3); a length of each time unit (one symbol); and the quantity of sub-time units within each time unit (6).

Figure 11:
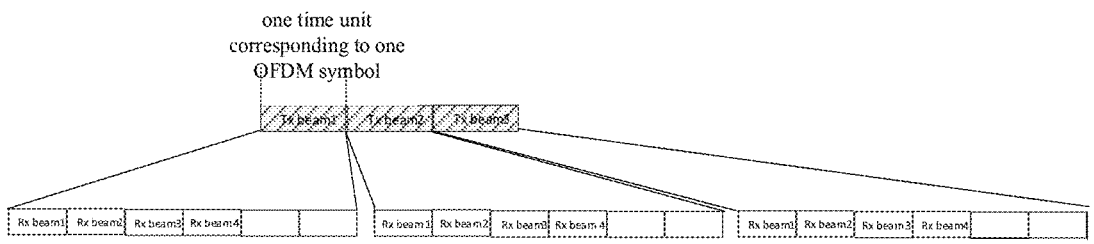
FIG. 11 is still yet another schematic view showing the beam training in the Rx beam sweeping mode in the related art.

As shown in FIG. 11, similar to that in FIG. 8, because it is impossible to switch the Tx beam within one time unit and each time unit corresponds to one OFDM symbol, the last two sub-time units of each time unit may be in the idle state, and totally three OFDM symbols may be required for measuring all the beams, resulting in a waste of the time resources.

(2) Beam Measurement Mode in the Embodiments of the Present Disclosure

When the Rx beam sweeping mode is adopted at first, totally two OFDM symbols may be required for measuring all the beams, and each OFDM symbol may include six time partition. The CSI-RS configuration information issued by the network side device may include: the quantity of transmission beams (3); the quantity of reception beams (4); a CSI-RS Resource Element (RE) pattern, the quantity of CSI-RS antenna ports and a CSI-RS period; the quantity of OFDM symbols (2); the quantity of time partition within each OFDM symbol (6); and the quantity of CSI-RS resources or CSI-RS ports supported within each time partition for each OFDM symbol (default).

Figure 12:
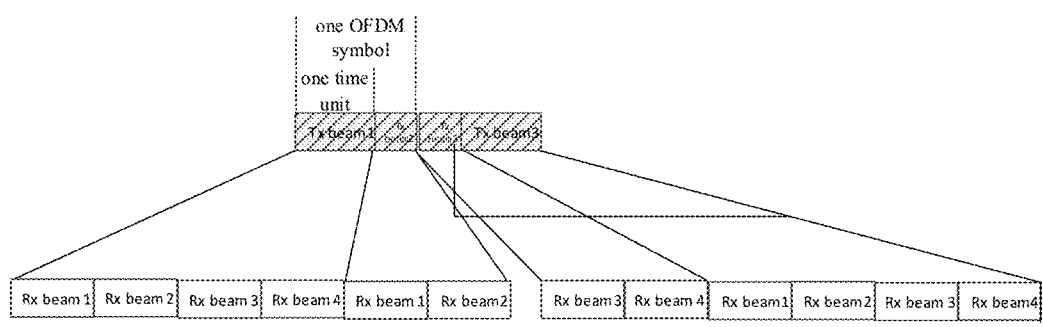
FIG. 12 is another schematic view showing the beam training in the Rx beam sweeping mode according to one embodiment of the present disclosure.

As shown in FIG. 12, after the UE has received the configuration information, the UE and the network side device may perform the beam measurement. Through comparing FIG. 11 with FIG. 12, according to the method in the embodiments of the present disclosure, one time unit may correspond to a non-integral multiple of OFDM symbols, e.g., ⅔ OFDM symbol in FIG. 12. Hence, the network side device may transmit a next Tx beam at the ⅔ OFDM symbol, and totally two OFDM symbols may be required for measuring all the beams. As compared with the situation in FIG. 11, one OFDM symbol may be saved, so it is able to shorten the time period of the entire beam training process.

In FIG. 12, the Rx beam sweeping mode is adopted at first. The method in the embodiments of the present disclosure will be described hereinafter in more details when the Tx beam sweeping mode is adopted at first.

The CSI-RS configuration information issued by the network side device may include: the quantity of transmission beams (3); the quantity of reception beams (4); a CSI-RS Resource Element (RE) pattern, the quantity of CSI-RS antenna ports and a CSI-RS period; the quantity of OFDM symbols (2); the quantity of time partition within each OFDM symbol (6); and the quantity of CSI-RS resources or CSI-RS ports supported within each time partition for each OFDM symbol (default).

Figure 13:
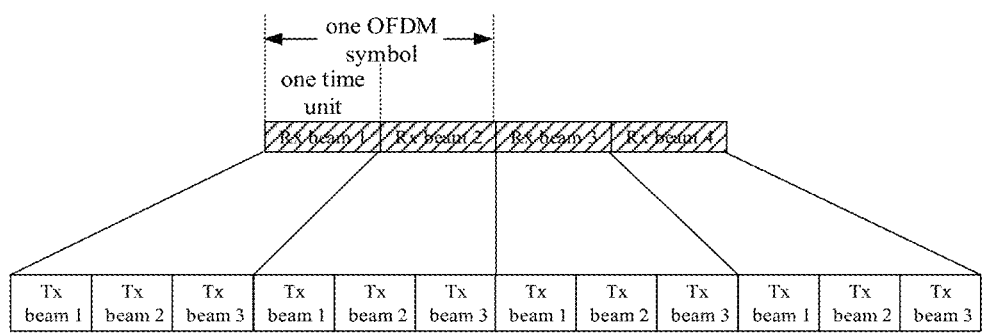
FIG. 13 is a schematic view showing the beam training in the Tx beam sweeping mode according to one embodiment of the present disclosure.

As shown in FIG. 13, when the network side device determines that it has completed the sweeping operation on Tx beam 1, Tx beam 2 and Tx beam 3 within a first time unit, it may start the sweeping operation on a next beam sweeping for all the Tx beams immediately after the previous sweeping operation. Identical to FIG. 12, totally two OFDM symbols may be required for measuring all the beams. As compared with the situation in FIG. 11, one OFDM symbol may be saved, so it is able to shorten the time period of the entire beam training process.

In a word, according to the method in the embodiments of the present disclosure, it is able to make full use of the measurement capability of the UE. The Tx beam or Rx beam may be changed within each OFDM symbol, i.e., one time unit may occupy a non-integral multiple of OFDM symbols (e.g., ½ OFDM symbol or ⅔ OFDM symbol) or an integral multiple of OFDM symbols. As a result, it is able to complete the measurement on all the beams as fast as possible, reduce a time delay of a beam management process, and reduce the waste of time resources during the beam management process, thereby to provide more resources for the data transmission.

It should be appreciated that, the above description merely relates to the situation where the network side device merely issues the configuration information to one UE and cooperates with the UE to complete the beam training. During the implementation, there may exist such a situation where a plurality of UEs is involved.

For example, there are four Tx beams for the network side device two Rx beams for UE1 and two Rx beams for UE2. UE1 is capable of supporting the beam measurement for two times within one symbol, and UE2 is capable of supporting the beam measurement for four times within one symbol. When the conventional measurement mode is adopted, the CSI-RS configuration information for UE1 may include: a beam sweeping mode in the measurement mode 1; the quantity of time units (4); a length of each time unit (one symbol); and the quantity of sub-time units (2). The UE1 may perform the beam measurement in a way as shown in FIG. 1.

The CSI-RS configuration information for UE2 may include: a beam sweeping mode in the measurement mode 2 (more symbols are required for the measurement mode 1); the quantity of time units (2); a length of each time unit (one symbol); and the quantity of sub-time units (4). The UE2 may perform the beam measurement in a way as shown in FIG. 1.

In other words, it is necessary to provide different CIS-RS configuration signaling to different UEs. When there is a large quantity of UEs, the resultant signaling overhead is very large. In addition, when there is a large quantity of UEs which are currently performing the beam sweeping operation, UE2 also needs to select the sweeping mode in the measurement mode 1 like UE1, so at this time the waste of sub-time units may also exist for UE2.

Based on the above, S103 of transmitting the CSI-RS configuration information may include transmitting the same CSI-RS configuration information to a plurality of UEs. With respect to different UE capabilities, a minimum value of the quantities of the maximum beam measurement times capable of being performed within one OFDM symbol may be selected for the plurality of UEs, i.e., the maximum beam measurement times capable of being performed within one OFDM symbol may be determined in accordance with the UE with the lowest capability. Then, the symbol partition information may be determined in accordance with the selected maximum beam measurement times, so as to meet the capability requirement of all the UEs when the beam training time period is capable of being shortened as possible.

Figure 14:
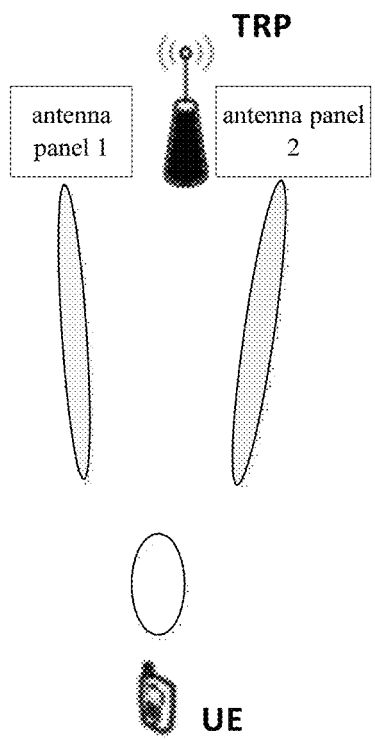
FIG. 14 is a schematic view showing a situation where a plurality of panels is provided according to one embodiment of the present disclosure.

In addition, the above description merely relates to a situation where the network side device is provided with one antenna panel. In the case of merely one antenna panel, the network side device is merely capable of transmitting one Tx beam within each time partition of one OFDM symbol, and the Tx beam merely corresponds to one CSI-RS resource. However, in actual use, as shown in FIG. 14, the network side device may also be provided with a plurality of antenna panels. At this time, the network side device may transmit one Tx beam through each antenna panel within one time partition, and a plurality of CSI-RS resources may be supported within the time partition.

In this case, when the CSI-RS configuration information is issued by the network side device, apart from the quantity of the transmission beams, the quantity of the reception beams and the symbol partition information, the CSI-RS configuration information may further include the quantity of CSI-RS resources or CSI-RS ports supported within each time partition of each OFDM symbol. Here, the quantity of the supported resources or ports just represents the quantity of the transmission beams capable of being used to transmit simultaneously. When a base station is provided with one Transmission Reception Point (TRP), the quantity of the supported resources or ports may represent the quantity of the antenna panels of the TRP. When the base station is provided with a plurality of TRPs, the quantity of the supported resources or ports may represent the total quantity of the antenna panels of the TRPs. Particularly, when each of the plurality of TRPs of the base station merely has one antenna panel, the quantity of the supported resources or ports may represent the quantity of TRPs of the base station. Upon the acquisition of the quantity of the supported resources or ports, the UE may determine the quantity of the transmission beams capable of being used to transmit by the network side device.

For example, the base station is merely provided with one TRP having two panels, there are two Tx beams for each panel and two Rx beams for the UE, and the UE is capable of supporting two time partition within each symbol. The CSI-RS configuration information may include: the quantity of Tx beams (4); the quantity of Rx beams (2); the quantity of OFDM symbols (2); the quantity of time units within each OFDM symbol (2); and the quantity of CSI-RS resources or CSI-RS ports supported within each time partition for each OFDM symbol (2).

Figure 15:
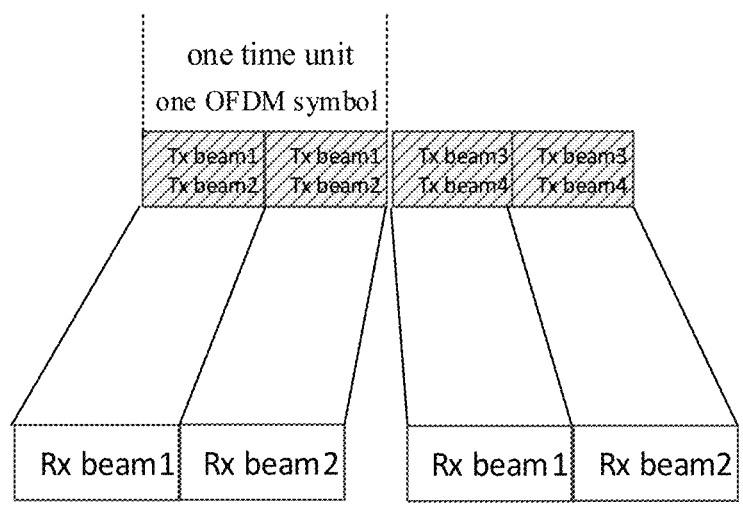
FIG. 15 is a schematic view showing the training of a plurality of beams at the same time according to one embodiment of the present disclosure.

The UE may perform the beam measurement upon the acquisition of these parameters. As shown in FIG. 15, Tx beam 1 and Tx beam 3 are Tx beams used to transmit through Panel 1, and Tx beam 2 and Tx beam 4 are Tx beams used to transmit through Panel 2. Within one time unit, Tx beam 1 and Tx beam 2 may be used to transmit through Panel 1 and Panel 2 simultaneously. However, the UE is merely capable of supporting two sub-time units within each symbol, i.e., supporting the beam measurement at most twice, so one time unit needs to occupy two OFDM symbols. The specific beam measurement process may be similar to that in the situation where a single panel is provided as mentioned hereinabove. FIG. 15 shows a beam measurement process where the Rx beam sweeping mode is adopted at first. For Panel 1, when the sweeping operation on Rx beam 1 and Rx beam 2 with respect to Tx beam 1 has been completed, it may start to transmit Tx beam 3 immediately after the sweeping operation. When the Tx beam sweeping mode is adopted at first, for Panel 1, when the sweeping operation on Tx beam 1 and Tx beam 3 with respect to Rx beam 1 has been completed, it may perform the weeping operation on a next beam sweeping for all the Tx beams immediately after the sweeping operation.

According to the method in the embodiments of the present disclosure, the CSI-RS configuration information may carry information indicating the quantity of CSI-RS resources or CSI-RS ports supported within each time partition, so it is able to support the measurement on a plurality of beams in the case of a plurality of TRPs and a plurality of panels, thereby to increase a speed for the beam management process. Of course, in actual use, apart from the situation where a plurality of CSI-RS resources corresponds to different antenna panels in FIG. 14, there may probably exist such a situation where a plurality of ports for one CSI-RS resource correspond to different antenna ports, and the implementation thereof may be similar to that mentioned hereinabove and thus will not be particularly herein. In addition, the panels may be located on one TRP or a plurality of TRPs, which will not be particularly defined herein.

According to the beam measurement processing method in the embodiments of the present disclosure, the network side device may issue the CSI-RS configuration information in various combinations, so that the UE may acquire contents of a current measurement task and cooperate with the network side device to perform the beam measurement within a next time unit after the ending of a current time unit, without any necessity to wait for the ending of one OFDM symbol. As a result, it is able to make full use of the maximum capability of the UE, and prevent the occurrence of the waste of time resources. In addition, it is able for the method in the embodiments of the present disclosure to support a multi-TRP and multi-panel mode, thereby to be widely applied to $5^{th}$-Generation (5G) communication.

Figure 16:
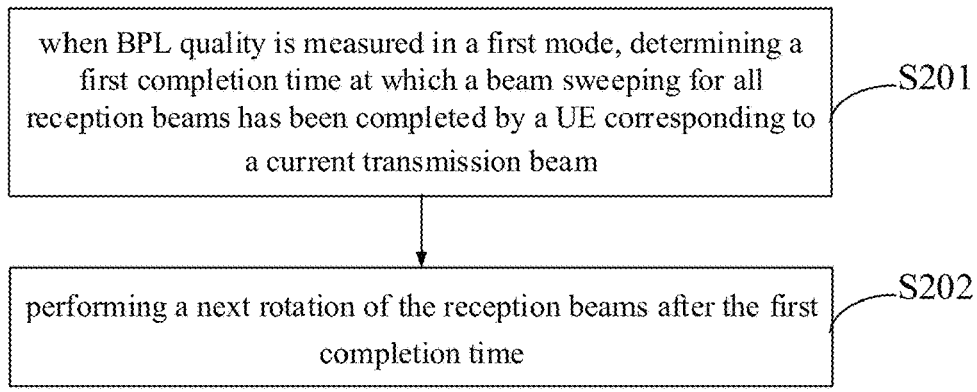
FIG. 16 is a flow chart of a beam measurement processing method according to one embodiment of the present disclosure.
Figure 17:
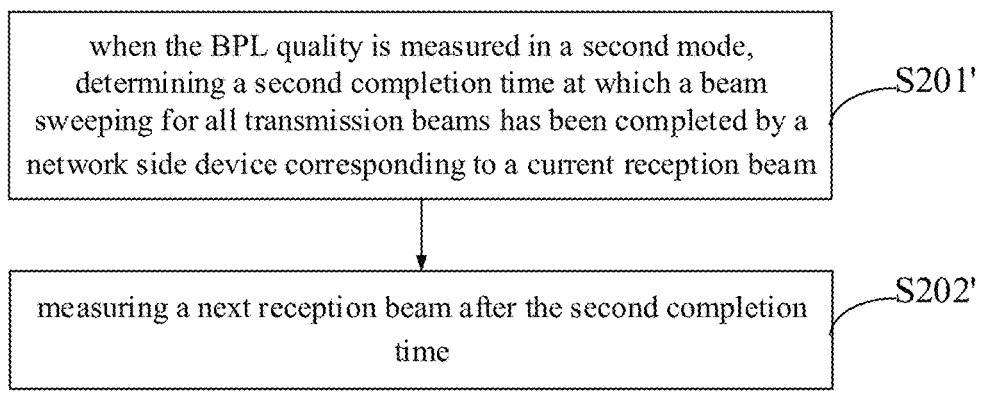
FIG. 17 is another flow chart of the beam measurement processing method according to one embodiment of the present disclosure.

Based on a same inventive concept, the present disclosure further provides in some embodiments a beam measurement processing method which, as shown in FIGS. 16 and 7, includes the following steps.

S202: when BPL quality is measured in a first mode, determining a first completion time at which a beam sweeping for all reception beams has been completed by a UE corresponding to a current transmission beam.

Here, the measuring the BPL quality in the first mode may include: before switching the transmission beam each time, performing the beam sweeping for all the reception beams, and measuring the link quality of each beam pair; and after the completion of the BPL quality measurement, switching to a next transmission beam and performing a next beam sweeping for all the reception beams, until the link quality of all beam pairs formed by each transmission beam and each reception beam has been measured.

S203: performing a next beam sweeping for all the reception beams after the first completion time.

S202': when the BPL quality is measured in a second mode, determining a second completion time at which a beam sweeping for all transmission beams has been completed by a network side device corresponding to a current reception beam.

Here, the measuring the BPL quality in the second mode may include: before switching the reception beam each time, performing the beam sweeping for all the transmission beams, and measuring the link quality of each beam pair; and after the completion of the BPL quality measurement, switching to a next reception beam and performing a next beam sweeping for all the transmission beams, until the link quality of all beam pairs formed by each transmission beam and each reception beam has been measured.

S203': switching to a next reception beam for measurement after the second completion time.

The first mode, the second mode, the first completion time and the second completion time have been described hereinabove, and thus will not be particularly defined herein.

According to the beam measurement processing method in the embodiments of the present disclosure, the UE may perform the next beam sweeping for all the reception beams after a beam sweeping for all reception beams, or measure the next reception beam by the beam sweeping of transmission beams has been completed. In this regard, after one time unit has been completed and before an ending time of a current OFDM symbol, it is unnecessary for the UE to wait for the ending of the OFDM symbol, i.e., it is unnecessary to meet such a condition that one time unit must occupy an integral multiple of OFDM symbols. Instead, it is able for the UE to perform the beam measurement directly within a next time unit occupying a non-integral multiple of OFDM symbols. As a result, it is able to make full use of a maximum measurement capability of the UE, shorten a time period for the entire beam measurement to the greatest content within the capacity of the UE, and save time resources, thereby to provide more resources for the data transmission.

Based on the above, prior to measuring the BPL quality, the method may further include: S201 of receiving CSI-RS configuration information from the network side device. The CSI-RS configuration information may be used to indicate the quantity of the transmission beams, the quantity of the reception beams and symbol partition information. The symbol partition information may be determined in accordance with a maximum quantity of time partition for the UE. The maximum quantity of time partition for the UE may refer to the maximum quantity of time partition for the OFDM symbol capable of being supported by the UE when a predetermined condition is met. The predetermined condition may include that the UE is capable of completing at least one BPL quality measurement within each time partition. The symbol partition information may include the quantity of time partition or a time length of each time partition to be divided within one OFDM symbol.

Here, the contents about "used to indicate", "the maximum quantity of time partition" and "time partition" as well as equivalent concepts have been described hereinabove, and thus will not be particularly defined herein.

Correspondingly, S202 may further include S2021 of determining a completion time at which the beam sweeping for all reception beams has been completed by the UE corresponding to the current transmission beam in accordance with the symbol partition information and the quantity of the reception beams. In other words, the UE may acquire a time for one measurement operation in accordance with the symbol partition information, and acquire a time required for one beam sweeping for all the reception beams in accordance with the quantity of the reception beams, so as to determine the completion time at which the beam sweeping for all the reception beams has been completed.

S202' may further include S2021' of determining a completion time at which the beam sweeping for all the transmission beams has been completed with respect to the current reception beam in accordance with the symbol partition information and the quantity of the transmission beams. In other words, the UE may acquire a time for one measurement operation in accordance with the symbol partition information, and acquire a time required for one beam sweeping for all the transmission beams in accordance with the quantity of the transmission beams, so as to determine the completion time at which one beam sweeping for all transmission beams has been completed.

According to the beam measurement processing method in the embodiments of the present disclosure, upon the receipt of the CSI-RS configuration information, the UE may start to perform the beam measurement. After one time unit has been completed and before the ending time of the OFDM symbol in which the time unit is located, the UE may directly perform the beam measurement within a next time unit, without any necessity to wait for the ending of the current OFDM symbol, i.e., one time unit may correspond to a non-integral multiple of OFDM symbols. As a result, it is able to make full use of the maximum measurement capability of the UE, shorten the time period for the entire beam measurement to the greatest content within the capacity of the UE, and save the time resources, thereby to provide more resources for the data transmission.

During the implementation, there may exist various circumstances for the CSI-RS configuration information received by the UE, and parameters included in the CSI-RS configuration information will be described hereinafter in more details. The CSI-RS configuration information may include all or parts of: (1) the quantity of the transmission beams; (2) the quantity of the reception beams; (3) CSI-RS resource configuration related information, including a CSI-RS RE pattern for each CSI-RS resource and the quantity of CSI-RS antenna ports; (4) time-domain repetition times associated with each CSI-RS resource; (5) the quantity of OFDM symbols; (6) the symbol partition information which may be the quantity of time partition within each OFDM symbol (i.e., the quantity of beam measurement times capable of being performed within each OFDM symbol) or a time length of each time partition (i.e., a time length of each beam measurement); (7) the quantity of CSI-RS resources or CSI-RS ports supported within one time partition for each OFDM symbol; (8) a CSI-RS period for indicating such parameters as a period of periodic beam management; (9) BPL quality measurement activation information; (10) a measurement mode indicator; (11) the quantity of symbol intervals; (12) CSI-RS resource quantity related information; and (13) beam selection mode indication information.

The parameters will be described hereinafter.

For (1) and (2), when a value of the quantity of the Tx beams and a value of the quantity of the Rx beams have been directly issued by the network side device, the UE may directly acquire the quantity of the Tx beams and the quantity of the Rx beams. Here, the value of the quantity of the Tx beams may be smaller than or equal to the quantity of the Tx beams supported by the network side device, and the value of the quantity of the Rx beams may be smaller than or equal to the quantity of the Rx beams supported by the network side device. In other words, merely several Tx beams or Rx beams may be measured in each beam training operation, so as to improve the beam training efficiency.

When the quantity of the Rx beams issued through the CSI-RS configuration information is smaller than the quantity of the Rx beams supported by the UE, the UE may select Rx beams at a same amount as the issued Rx beams in accordance with a predetermined rule, so as to perform the beam measurement. When there are five Rx beams for the UE, the UE may know logic numbers of the five Rx beams, e.g., the UE may assign numbers 1 to 5 to these five Rx beams respectively. When a third Rx beam is a reception beam of an optimum BPL in a previous beam training operation and the quantity of the Rx beams issued currently is 3, a second Rx beam, the third Rx beam and a fourth Rx beam, or the first Rx beam, the third Rx beam and a fifth Rx beam, may be selected for a current beam training operation with the third Rx beam as a center. Of course, any other selection mode may also be applied, which will not be particularly defined herein. In actual use, there may exist two circumstances for the selection. In a first circumstance, a fixed selection mode has been set by the UE. In another circumstance, the network side device may issue the parameter (13), i.e., the beam selection mode indication information, to the UE so as to indicate a beam selection mode.

There may also exist some particular circumstances for the quantity of the Tx beams and the quantity of the Rx beams. For example, the network side device may agree with the UE in advance that the quantity of the Rx beams to be trained currently is equal to, by default, the quantity of the Rx beams supported by the UE when the quantity of the Rx beams is in a default state. There exists a certain logic relationship between the quantity of the Tx beams as well as the quantity of the Rx beam and the other configuration parameters, so the quantity of the Tx beams and the quantity of the Rx beams may be calculated in accordance with the other configuration parameters. When the quantity of the Rx beams in the configuration parameters issued by the network side device is set to be in the default state so as to enable the UE to consider that all the Rx beams need to be trained currently, as a reasonable explanation, it is impossible for the UE to calculate the quantity of the Rx beams in accordance with the parameters currently issued by the network side device. At this time, the UE may consider that all the Rx beams need to be trained when the quantity of the Rx beams is in the default state.

For (3) and (4), the beam measurement is performed so as to enable the network side device to determine which one or ones of the Tx beams are optimum transmission beams. However, each Tx beam itself is not provided with any identity. After the beam measurement, the UE may report, in a beam report, an identity of the optimum Tx beam through reporting a CSI-RS resource identity, or the CSI-RS resource identity and a time identity. To be specific, the quantity of the Tx beams may be greater than or equal to the quantity of the CSI-RS resources, i.e., one CSI-RS resource may be transmitted through one or more Tx beams. When the CSI-RS resource is transmitted through one Tx beam, the CSI-RS resource identity may be directly reported, so that the network side device may determine the Tx beam through which the CSI-RS resource is transmitted in accordance with the CSI-RS resource identity. When the CSI-RS resource is transmitted through more than one Tx beam and merely the CSI-RS resource identity is reported, the network side device may probably be incapable of determining the Tx beam. However, the Tx beams are used to transmit at different times, so it is necessary to report the time identity so as to enable the network side device to determine the specific Tx beam.

Here, the resource identity of each CSI-RS resource may be determined in accordance with the CSI-RS resource configuration related information, and the CSI-RS resource configuration related information may include the CSI-RS RE pattern of each CSI-RS resource and the quantity of the CSI-RS antenna ports. Of course, the CSI-RS resource configuration related information may also include any other information.

It should be appreciated that, when the configuration information includes several pieces of CSI-RS resource configuration related information, the UE may also acquire the total quantity of the CSI-RS resources, i.e., the total quantity of the CSI-RS resources may be implicitly indicated through the several pieces of CSI-RS resource configuration related information. A product of the total quantity A of the CSI-RS resources and the time-domain repetition times B associated with each CSI-RS resource may be just the total times of the beam measurement to be performed. When the quantity of the Tx beams is M and the quantity of the Rx beams is N, M*N=A*B. A product at each side of the formula may represent the total times of the beam measurement to be performed. Hence, it is able to acquire values of M and N in accordance with the formula.

Of course, apart from the CSI-RS resource configuration related information, the total quantity of the CSI-RS resources may also be indicated in an explicit manner. In other words, the CSI-RS configuration information may further include the above parameter (12), i.e., the CSI-RS resource quantity related information. The CSI-RS resource quantity related information may directly be a specific value of the quantity of the CSI-RS resources, or information indicating the quantity of the CSI-RS resources, which will not be particularly defined herein.

For (5) and (6), when the quantity of the OFDM symbols is L, the quantity of the time partition within each symbol is P, the quantity of the Tx beams is M and the quantity of the Rx beams is N, there may exist the following circumstances.

When L*P=M*N, it means that the beam sweeping operation on all the Tx beams and Rx beams has been completed within the L OFDM symbols. At this time, it is merely necessary to acquire three of (1), (2), (5) and (6), and the remaining one may be deduced in accordance with the three parameters. However, there is no one-to-one correspondence between each parameter at one side of the formula and each parameter at the other side of the formula, e.g., L may not be necessarily equal to M, and P may not be necessarily equal to N. Hence, three of (1), (2), (5) and (6) may be issued, and then the UE may acquire the remaining one in accordance with the formula.

When L*P>M*N, it means that there may exist some remaining time partition after the BPL quality measurement on all the Tx beams and Rx beams within the L OFDM symbols, where L is a minimum integer capable of meeting the formula. In other words, when M is 3, N is 7 and P is 6, L may be 4. The network side device knows values of M, N, L and P when configuring L and P, so the network side device may definitely configure the L and P in accordance with M and N, so as to reduce the waste of resources as possible. On this premise, when merely the values of N (or M), L and P are issued by the network side device, the UE may also acquire the value of M (or N) in accordance with the formula. For example, when N is 7, P is 6 and L is 4, M may be a maximum integer meeting the formula, i.e., M=3. Of course, it is merely a possible situation where the M is the maximum integer meeting the formula, and UE may acquire erroneous values of M and N. In other words, when the UE wants to acquire the value of one of M and N in accordance with the formula, the network side device must ensure that the value acquired by the UE in accordance with the formula is correct. Hence, the network side device may issue three of (1), (2), (5) and (6), and then the UE may acquire the value of the remaining parameter in accordance with the formula.

When L*P>M*N, it should be appreciated that, the times of the beam measurement configured by the base station and the UE are greater than the total quantity of times of the beam measurement for the entire beam training operation, so there may probably exist such a situation where the idle time partition are omitted as shown in FIG. 10. In this case, according to the method in the embodiments of the present disclosure, some other information may also be carried in these idle time partition. For example, the UE which performs the beam training using a large subcarrier spacing may transmit a control message or data or any other reference signal within the remaining time partition, so as to make full use of these time partition and improve the resource utilization.

For (7), when merely a single beam is capable of being measured within a time unit, i.e., when there is merely a single panel, the parameter (7) may be omitted. When a plurality of beams is capable of being measured within a time partition, i.e., when there is a plurality of TRPs or panels and Q CSI-RS resources (a plurality of CSI-RS ports within a same CSI-RS resource may use a same Tx beam) or Q CSI-RS antenna ports are supported within the time unit for each OFDM symbol, it means that Q Tx beams measurement may be performed simultaneously. When the network side device is provided with Q panels, each panel may generate one Tx beam at the same time, i.e., totally Q Tx beams may be generated simultaneously.

For (8), it may be required for the periodic beam training. In the periodic beam training, the Tx beam sweeping operation and the Rx beam sweeping operation may be performed periodically in accordance with the parameter (8).

For (9), it may be configured in the CSI-RS configuration information for semi-persistent beam training. This parameter is activation signaling for activating the UE to perform the beam training until deactivation signaling has been received from the network side device. The Tx beam sweeping operation and the Rx beam sweeping operation may be performed once or more times between the two pieces of signaling (when the sweeping operations are performed multiple times, they may be performed periodically or non-periodically).

Of course, the activation signaling and the deactivation signaling may also not be configured in the CSI-RS configuration information, or may be issued at a layer different from the CSI-RS configuration information (the layer may refer to a Radio Resource Control (RRC) layer, a Media Access Control (MAC) layer or a physical layer), which will not be particularly defined herein.

In addition, the network side device may also control the UE to merely perform the beam training one time. For example, the network side device may transmit a triggering signaling so as to trigger the UE to perform each of the Tx beam sweeping operation and the Rx beam sweeping operation one time. Usually, because the triggering signaling needs to be issued quickly for the one-time beam training, it may be issued through the physical layer. Upon the receipt of the triggering signal, the UE may perform the one-time beam training immediately.

For (10), it may be notified to the UE through explicit signaling or in an implicit manner. Upon the receipt of the measurement mode indicator indicating the beam sweeping mode, the UE may select whether to perform the measurement in the Rx beam sweeping mode or the measurement in the Tx beam sweeping mode at first in accordance with the measurement mode indicator.

Alternatively, this signaling may also be omitted. The beam sweeping mode may be pre-agreed by the UE and the network side device. For example, one Tx beam may be selected for the Rx beam sweeping operation, and then the Tx beams may be switched for the Tx beam sweeping operation.

For (11), as prescribed by the network side device, the UE may perform the beam training within consecutive OFDM symbols, or within discrete OFDM symbols. When the OFDM symbols are discrete, the network side device further needs to issue the quantity of the symbol intervals for indicating the quantity of the symbols by which the OFDM symbols for the beam training are spaced apart from each other. For example, the beam training may be performed within every two OFDM symbols. After the beam training has been performed within a first OFDM symbol, the UE may continue to perform the beam training within a third symbol.

It should be appreciated that, the CSI-RS configuration information may be issued to the UE through RRC signaling, an MAC Control Element (CE) or Downlink Control Indicator (DCI).

As mentioned above, with respect to different relationships among the parameters, the UE may acquire the quantity of the transmission beams and the quantity of the reception beams in accordance with the CSI-RS configuration information in various ways, and some of these ways will be described hereinafter.

1. Circumstance where a single panel is provided, i.e., the parameter (7) is in a default state.

(a) When the CSI-RS configuration information includes the quantity of the Tx beams and the quantity of the Rx beams, the UE may directly extract the quantity of the Tx beams and the quantity of the Rx beams from the CSI-RS configuration information.

(b) When the CSI-RS configuration information includes CSI-RS resource description information and the quantity of first beams (e.g., one of the quantity of the Tx beams and the quantity of the Rx beams), the UE may calculate the quantity of second beams (e.g., the other one of the quantity of the Tx beams and the quantity of the Rx beams) in accordance with the time-domain repetition times, the CSI-RS resource quantity related information and the quantity of the first beams. In other words, the UE may acquire the quantity of the Tx beams and the quantity of the Rx beams in accordance with the formula M*N=A*B, where A represents the CSI-RS resource quantity related information, and B represents the time-domain repetition times associated with each CSI-RS resource.

(c) When the CSI-RS configuration information includes the CSI-RS resource description information, the quantity N of the Rx beams is set in the default state and the UE agrees with the network side device in advance that all the Rx beams need to be measured in the case that N is in the default that, the UE may take the quantity of Rx beams supported by the UE as the quantity of the Rx beams, and calculate the quantity of the Tx beams in accordance with the formula M*N=A*B.

(d) When the CSI-RS configuration information includes the total quantity L of the OFDM symbols, the symbol partition information and the quantity of the first beams (e.g., one of the quantity M of the Tx beams and the quantity N of the Rx beams) and the symbol partition information is the quantity of times of beam measurement (i.e., the quantity P of the time partition within each OFDM symbol), the UE may acquire the other one of M and N in accordance with the formula L*P≥M*N. When the symbol partition information is the time length of the beam measurement (i.e., the time length of each time partition), the UE may acquire the quantity P of the time partition within each OFDM symbol in accordance with the time length, and then calculate the value of the other one of M and N in accordance with the formula L*P≥M*N. As mentioned above, a calculation error may occur when calculating the value of the other one of M and N in accordance with L*P≥M*N. When the UE wants to acquire the quantity of the first beams or the second beams in accordance with the formula, it is necessary to ensure that the quantity of the beams acquired by the UE is correct. The same may also be applied to a circumstance where one of M and N in accordance with the formula L*P≥M*N mentioned hereinafter, and thus will not be particularly defined hereinafter.

(e) When the CSI-RS configuration information includes the total quantity of the OFDM symbols and the symbol partition information, it may be similar to (d). However, the UE may consider at first that all the Rx beams need to be measured in accordance with the agreement with the network side device, take the quantity of Rx beams supported by the UE as the quantity of the Rx beams, and then calculate the quantity of the Tx beams in accordance with the formula L*P≥M*N.

For (c) and (e), it should be appreciated that, when N is in a default state, it means that all the Rx beams need to be measured, which however should be agreed by the UE and the network side device in advance. When N is in the default state but there is no agreement by the UE and the network side device, it does not mean that all the Rx beams need to be measured.

(2) Circumstance where a plurality of panels is provided, i.e., the parameter (7) is issued.

(a) When the CSI-RS configuration information includes the quantity D of CSI-RS resources or CSI-RS antenna ports supported within each beam measurement, the CSI-RS resource description information and one of the quantity N of the Rx beams and the quantity M of the Tx beams, the UE may calculate the other one of N and M in accordance with the quantity D of CSI-RS resources or CSI-RS antenna ports supported within each beam measurement, the time-domain repetition times B of each CSI-RS resource, the information A related to the quantity of CSI-RS resources and one of N and M. To be specific, at this time, (M/D)*N=AB should be met.

(b) When the CSI-RS configuration information includes the quantity of the CSI-RS resources or CSI-RS antenna ports supported within each beam measurement and the CSI-RS resource description information, i.e., a situation where N is in the default state, similar to (a), the UE may take the quantity of Rx beams supported by the UE as the quantity of the Rx beams, and calculate the quantity of the Tx beams in accordance with the quantity of the CSI-RS resources or CSI-RS antenna ports supported within each beam measurement, the time-domain repetition times, the CSI-RS resource quantity related information, and the quantity of the Rx beams.

(c) When the CSI-RS configuration information includes the quantity of the CSI-RS resources or CSI-RS antenna ports supported within each beam measurement, one of M and N, the total quantity of the OFDM symbols and the symbol partition information, the UE may acquire the quantity P of the times of beam measurement in accordance with the symbol partition information, and calculate the other one of M and N in accordance with the quantity of the CSI-RS resources or CSI-RS antenna ports supported within each beam measurement, the one of M and N, the total quantity L of the OFDM symbols and the quantity P of the times of beam measurement. To be specific, at this time, the formula L*P≥(M/D)*N should be met.

(d) When the CSI-RS configuration information includes the quantity of the CSI-RS resources or CSI-RS antenna ports supported within each beam measurement, the total quantity of the OFDM symbols and the symbol partition information, i.e., a situation where N is in the default state, similar to (c), the UE may take the quantity of Rx beams supported by the UE as the quantity of the Rx beams, and then calculate the quantity of the Tx beams in accordance with the quantity of the CSI-RS resources or CSI-RS antenna ports supported within each beam measurement, the quantity of the Rx beams, the total quantity of the OFDM symbols and the symbol partition information.

In a word, with respect to different application scenarios, the CSI-RS configuration information may be issued by the network side device in various combinations. The network side device may issue an appropriate configuration information combination according to the practical need, e.g., a combination through which signaling resources may be saved maximally. The UE may also acquire the measurement parameters directly or indirectly in accordance with the relationship among the parameters according to different combinations, so as to complete the entire beam measurement. Due to the configuration information in various combinations as well as the various modes of the UE and the network side device, it is able to apply the method in the embodiments of the present disclosure to different application scenarios in the 5G communication.

It should be appreciated that, those list in the above parts 1 and 2 are merely possible ways in the embodiments of the present disclosure, and in actual use, the quantity of the Tx beams and the quantity of the Rx beams may be acquired in any other ways in accordance with the logic relationship among the parameters.

According to the beam measurement processing method in the embodiments of the present disclosure, the UE may cooperate with the network side device in accordance with the configuration information from the network side device, so as to perform the beam measurement. The beam measurement may be performed within a next time unit after the beam measurement within one time unit has been completed, so it is unnecessary to meet such a condition that one time unit occupies an integral multiple of OFDM symbols. As a result, it is able to enter the next time unit when the OFDM symbol has not been ended yet, thereby to make full use of the maximum capability of the UE, shorten the time period for the entire beam training as possible and save the time resources. In addition, the UE may flexibly acquire the parameters for the beam measurement in accordance with the configuration parameters, and perform the beam training in different modes in accordance with the indication information from the network side device, so it is able to provide more beam training modes for the 5G communication.

Figure 18:
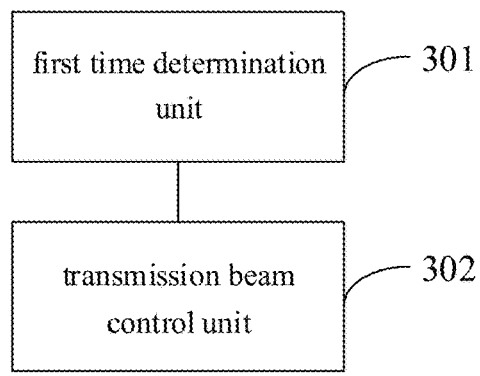
FIG. 18 is a schematic view showing a beam measurement processing device according to one embodiment of the present disclosure.

The present disclosure further provides in some embodiments a beam measurement processing device which, as shown in FIG. 18, includes a first time determination unit 301 and a transmission beam control unit 302. The first time determination unit 301 is configured to, when BPL quality is measured in a first mode, determine a first completion time at which a beam sweeping for all reception beams has been completed by a UE corresponding to a current transmission beam, and the transmission beam control unit 302 is configured to transmit a next transmission beam after the first completion time; and/or the first time determination unit 301 is configured to, when the BPL quality is measured in a second mode, determine a second completion time at which a beam sweeping for all transmission beams has been completed by a network side device corresponding to a current reception beam, and the transmission beam control unit 302 is configured to perform a next beam sweeping for all the transmission beams after the second completion time.

In a possible embodiment of the present disclosure, the measuring the BPL quality in the first mode may include: before switching the transmission beam each time, performing the beam sweeping for all the reception beams, and measuring the link quality of each beam pair; and after the completion of the BPL quality measurement, switching to a next transmission beam and performing a next beam sweeping for all the reception beams, until the link quality of all beam pairs formed by each transmission beam and each reception beam has been measured. The measuring the BPL quality in the second mode may include: before switching the reception beam each time, performing the beam sweeping for all the transmission beams, and measuring the link quality of each beam pair; and after the completion of the BPL quality measurement, switching to a next reception beam and performing a next beam sweeping for all the transmission beams, until the link quality of all beam pairs formed by each transmission beam and each reception beam has been measured.

In a possible embodiment of the present disclosure, the beam measurement processing device may further include: a first beam quantity determination unit configured to, prior to the measurement on the BPL quality, determine the quantity of the transmission beams and the quantity of the reception beams, and determine a respective transmission beam in accordance with the quantity of the transmission beams; a symbol partition configured to determine symbol partition information in accordance with a maximum quantity of time partition for the UE; and a configuration information issuing unit configured to transmit CSI-RS configuration information to the UE, the CSI-RS configuration information being used to indicate the quantity of the transmission beams, the quantity of the reception beams and the symbol partition information. The first time determination unit 301 is further configured to determine the first completion time at which the beam sweeping for all reception beams has been completed by the UE corresponding to the current transmission beam in accordance with the symbol partition information and the quantity of the reception beams, or determine the second completion time at which the beam sweeping for all transmission beams has been completed by the network side device corresponding to the current reception beam in accordance with the symbol partition information and the quantity of the transmission beams.

The maximum quantity of time partition for the UE may be the maximum quantity of time partition for the OFDM symbol capable of being supported by the UE when a predetermined condition is met. The predetermined condition may include that the UE is capable of completing at least one BPL quality measurement within each time partition. The symbol partition information may include the quantity of time partition or a time length of each time partition to be divided within one OFDM symbol.

In a possible embodiment of the present disclosure, the CSI-RS configuration information may include at least one of the symbol partition information, the quantity of the transmission beams, the quantity of the reception beams, CSI-RS resource configuration related information, CSI-RS resource quantity related information, time-domain repetition times associated with each CSI-RS resource, a total quantity of OFDM symbols, a measurement mode indicator, the quantity of symbol intervals, a CSI-RS period, beam selection mode indication information, BPL quality measurement activation information, and the quantity of CSI-RS resources or CSI-RS ports supported within each time partition. The CSI-RS resource configuration related information may include a CSI-RS RE pattern and the quantity of CSI-RS antenna ports.

In a possible embodiment of the present disclosure, the configuration information issuing unit is further configured to transmit same CSI-RS configuration information to a plurality of UEs, and the maximum quantity of time partition may be a minimum value of the quantities of the maximum quantity of time partition corresponding to the plurality of UEs.

According to the beam measurement processing device in the embodiments of the present disclosure, after the first time determination unit 301 has determined that one beam sweeping for all reception beams has been completed, the transmission beam control unit 302 may transmit the next transmission beam, or after the first time determination unit 301 has determined that one beam sweeping for all transmission beams has been completed, the transmission beam control unit 302 may perform the next beam sweeping for all the transmission beams. In this regard, after one time unit has been completed and before an ending time of a current OFDM symbol, it is able for the network side device to directly measure the beams within a next time unit with respect to a non-integral multiple of OFDM symbols, without any necessity to wait for the ending of the current OFDM symbol, i.e., without any necessity to meet such a condition that one time unit must occupy an integral multiple of OFDM symbols. As a result, it is able to make full use of a maximum measurement capability of the UE, shorten a time period for the entire beam measurement to the greatest content within the capacity of the UE, and save time resources, thereby to provide more resources for the data transmission.

The present disclosure further provides in some embodiments a network side device, including a processor, a memory, and a computer program stored in the memory and executed by the processor. The processor is configured to execute the computer program so as to implement the above-mentioned beam measurement processing method with a same technical effect, which will thus not be particularly defined herein.

The present disclosure further provides in some embodiments a computer-readable storage medium storing therein a computer program. The computer program is executed by a processor so as to implement the above-mentioned beam measurement processing method with a same technical effect, which will thus not be particularly defined herein. The computer-readable storage medium may be Read-Only Memory (ROM), Random Access Memory (RAM), magnetic disk or optical disk.

Figure 19:
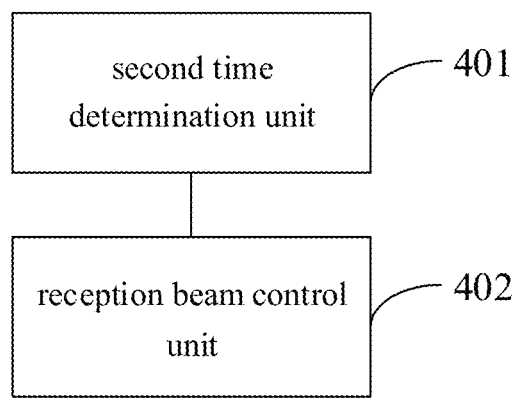
FIG. 19 is another schematic view showing a beam measurement processing device according to one embodiment of the present disclosure.

The present disclosure further provides in some embodiments a beam measurement processing device for a UE which, as shown in FIG. 19, includes a second time determination unit 401 and a reception beam control unit 402. The second time determination unit 401 is configured to, when BPL quality is measured in a first mode, determine a first completion time at which a beam sweeping for all reception beams has been completed by the UE corresponding to a current transmission beam, and the reception beam control unit 402 is configured to perform a next beam sweeping for all the reception beams after the first completion time; and/or the second time determination unit 401 is configured to, when the BPL quality is measured in a second mode, determine a second completion time at which a beam sweeping for all transmission beams has been completed by a network side device corresponding to a current reception beam, and the reception beam control unit 402 is configured to measure a next reception beam after the second completion time.

In a possible embodiment of the present disclosure, the measuring the BPL quality in the first mode may include: before switching the transmission beam each time, performing the beam sweeping for all the reception beams, and measuring the link quality of each beam pair; and after the completion of the BPL quality measurement, switching to a next transmission beam and performing a next beam sweeping for all the reception beams, until the link quality of all beam pairs formed by each transmission beam and each reception beam has been measured. The measuring the BPL quality in the second mode may include: before switching the reception beam each time, performing the beam sweeping for all the transmission beams, and measuring the link quality of each beam pair; and after the completion of the BPL quality measurement, switching to a next reception beam and performing a next beam sweeping for all the transmission beams, until the link quality of all beam pairs formed by each transmission beam and each reception beam has been measured.

In a possible embodiment of the present disclosure, the beam measurement processing device may further include a second beam quantity determination unit configured to, prior to the measurement of the BPL quality, receive CSI-RS configuration information from the network side device. The second time determination unit 401 is further configured to determine the first completion time at which the beam sweeping for all reception beams has been completed by the UE corresponding to the current transmission beam in accordance with symbol partition information and the quantity of reception beams. The second time determination unit 401 is further configured to determine the second completion time at which the beam sweeping for all transmission beams has been completed by the network side device corresponding to the current reception beam in accordance with the symbol partition information and the quantity of the transmission beams. The CSI-RS configuration information may be used to indicate the quantity of the transmission beams, the quantity of the reception beams and the symbol partition information. The symbol partition information may be determined in accordance with a maximum quantity of time partition for the UE. The maximum quantity of time partition for the UE may be the maximum quantity of time partition for the OFDM symbol capable of being supported by the UE when a predetermined condition is met. The predetermined condition may include that the UE is capable of completing at least one BPL quality measurement within each time partition. The symbol partition information may include the quantity of time partition or a time length of each time partition to be divided within one OFDM symbol.

In a possible embodiment of the present disclosure, when the CSI-RS configuration information includes the quantity of the transmission beams and the quantity of the reception beams, the second beam quantity determination unit is further configured to, before the measurement on the BPL quality, extract the quantity of the transmission beams and the quantity of the reception beams from the CSI-RS configuration information.

In a possible embodiment of the present disclosure, when the CSI-RS configuration information includes time-domain repetition times associated with each CSI-RS resource, one of CSI-RS resource quantity related information and CSI-RS resource configuration related information, and the quantity of first beams, the second beam quantity determination unit is further configured to, before the measurement on the BPL quality, calculate the quantity of second beams in accordance with the time-domain repetition times, the one of the CSI-RS resource quantity related information and the CSI-RS resource configuration related information, and the quantity of the first beams. Each first beam may be one of the transmission beam and the reception beam, and each second beam may be the other one of the transmission beam and the reception beam.

In a possible embodiment of the present disclosure, when the CSI-RS configuration information includes the time-domain repetition times associated with each CSI-RS resource and one of the CSI-RS resource quantity related information and the CSI-RS resource configuration related information, the second beam quantity determination unit is further configured to: before the measurement on the BPL quality, determine the quantity of reception beams supported by the UE as the quantity of the reception beams; and calculate the quantity of the transmission beams in accordance with the time-domain repetition times associated with each CSI-RS resource, the one of the CSI-RS resource quantity related information and the CSI-RS resource configuration related information, and the quantity of the reception beams.

In a possible embodiment of the present disclosure, when the CSI-RS configuration information includes a total quantity of OFDM symbols, the symbol partition information and the quantity of third beams, the second beam quantity determination unit is further configured to, before the measurement on the BPL quality, calculate the quantity of fourth beams in accordance with the total quantity of the OFDM symbols, the symbol partition information and the quantity of the third beams. Each third beam may be one of the reception beam and the transmission beam, and each fourth beam may be the other one of the reception beam and the transmission beam.

In a possible embodiment of the present disclosure, when the CSI-RS configuration information includes the total quantity of the OFDM symbols and the symbol partition information, the second beam quantity determination unit is further configured to: before the measurement on the BPL quality, determine the quantity of reception beams supported by the UE as the quantity of the reception beams; and calculate the quantity of the transmission beams in accordance with the total quantity of the OFDM symbols and the symbol partition information.

In a possible embodiment of the present disclosure, when the CSI-RS configuration information includes the quantity of CSI-RS resources or CSI-RS ports supported within each time partition, one of the CSI-RS resource quantity related information and the CSI-RS resource configuration related information, the time-domain repetition times associated with each CSI-RS resource and the quantity of fifth beams, the second beam quantity determination unit is further configured to, before the measurement on the BPL quality, calculate the quantity of sixth beams in accordance with the quantity of CSI-RS resources or CSI-RS ports supported within each time partition, the one of the CSI-RS resource quantity related information and the CSI-RS resource configuration related information, the time-domain repetition times associated with each CSI-RS resource and the quantity of the fifth beams. Each fifth beam may be one of the transmission beam and the reception beam, and each sixth beam may be the other one of the transmission beam and the reception beam.

In a possible embodiment of the present disclosure, when the CSI-RS configuration information includes the quantity of CSI-RS resources or CSI-RS ports supported within each time partition, one of the CSI-RS resource quantity related information and the CSI-RS resource configuration related information, and the time-domain repetition times associated with each CSI-RS resource, the second beam quantity determination unit is further configured to: before the measurement on the BPL quality, determine the quantity of reception beams supported by the UE as the quantity of the reception beams; and calculate the quantity of the transmission beams in accordance with the quantity of CSI-RS resources or CSI-RS ports supported within each time partition, the one of the CSI-RS resource quantity related information and the CSI-RS resource configuration related information, the time-domain repetition times associated with each CSI-RS resource and the quantity of the reception beams.

In a possible embodiment of the present disclosure, when the CSI-RS configuration information includes the quantity of CSI-RS resources or CSI-RS ports supported within each time partition, the quantity of seventh beams, the total quantity of OFDM symbols and the symbol partition information, the second beam quantity determination unit is further configured to, before the measurement on the BPL quality, calculate the quantity of eighth beams in accordance with the quantity of CSI-RS resources or CSI-RS ports supported within each time partition, the quantity of the seventh beams, the total quantity of OFDM symbols and the symbol partition information. Each seventh beam may be one of the reception beam and the transmission beam, and each eighth beam may be the other one of the reception beam and the transmission beam.

In a possible embodiment of the present disclosure, when the CSI-RS configuration information includes the quantity of CSI-RS resources or CSI-RS ports supported within each time partition, the total quantity of OFDM symbols and the symbol partition information, the second beam quantity determination unit is further configured to, before the measurement on the BPL quality, take the quantity of reception beams supported by the UE as the quantity of the reception beams, and calculate the quantity of the transmission beams in accordance with the quantity of CSI-RS resources or CSI-RS ports supported within each time partition, the quantity of the reception beams, the total quantity of OFDM symbols and the symbol partition information.

In a possible embodiment of the present disclosure, when the CSI-RS configuration information further includes a measurement mode indicator, the second beam quantity determination unit is further configured to, before the measurement on the BPL quality, select a measurement mode for the BPL quality in accordance with the measurement mode indicator. The measurement mode may include the first mode and the second mode.

In a possible embodiment of the present disclosure, when the CSI-RS configuration information further includes BPL quality measurement activation information, the device may further include a first measurement control module configured to perform the measurement on the BPL quality in accordance with the BPL quality measurement activation information, and stop the BPL quality measurement upon the receipt of BPL quality measurement deactivation information from the network side device.

In a possible embodiment of the present disclosure, when the CSI-RS configuration information further includes a CSI-RS period, the device may further include a second measurement control module configured to, during the measurement on the BPL quality, perform the measurement on the BPL quality in accordance with the CSI-RS period.

In a possible embodiment of the present disclosure, when the CSI-RS configuration information further includes the quantity of symbol intervals, the device may further include a third measurement control module configured to, during the measurement on the BPL quality, perform the measurement on the BPL quality within discrete OFDM symbols in accordance with the quantity of the symbol intervals.

In a possible embodiment of the present disclosure, the device may further include: a fourth measurement control module configured to, when the quantity of the reception beams is smaller than the quantity of reception beams supported by the UE, select the reception beams at a same amount as the quantity of the reception beams for the beam measurement; or a fifth measurement control module configured to, when the CSI-RS configuration information further includes beam selection mode indication information, select the reception beams at a same amount as the quantity of the reception beams for the beam measurement in accordance with the beam selection mode indication information.

In a possible embodiment of the present disclosure, when selecting the reception beams at a same amount as the quantity of the reception beams for the beam measurement, an optimum reception beam in previous BPL quality measurement and several reception beams adjacent to the optimum reception beam may be selected as target reception beams for the beam measurement; or the optimum reception beam in the previous BPL quality measurement and several reception beams spaced apart from the optimum reception beam at a same interval may be selected as the target reception beams for the beam measurement.

According to the beam measurement processing device in the embodiments of the present disclosure, after the second time determination unit has determined that one beam sweeping for all reception beams has been completed, the reception beam control unit may perform the next beam sweeping for all the reception beams, or after the second time determination unit has determined that one beam sweeping for all the transmission beams has been completed, the reception beam control unit may measure a next reception beam. In this regard, after one time unit has been completed and before an ending time of a current OFDM symbol, it is unnecessary for the UE to wait for the ending of the OFDM symbol, i.e., it is unnecessary to meet such a condition that one time unit must occupy an integral multiple of OFDM symbols. Instead, it is able for the UE to perform the beam measurement directly within a next time unit occupying a non-integral multiple of OFDM symbols. As a result, it is able to make full use of a maximum measurement capability of the UE, shorten a time period for the entire beam measurement to the greatest content within the capacity of the UE, and save time resources, thereby to provide more resources for the data transmission.

The beam measurement processing devices mentioned hereinabove are devices capable of implementing the above-mentioned beam measurement processing methods respectively. Based on the above-mentioned beam measurement processing methods, a person skilled in the art may understood the implementations of the beam measurement processing devices and the variations thereof, so how to implement a message transmission method through the beam measurement processing devices will not be particularly defined herein. All the devices capable of implementing the message transmission method shall fall within the scope of the present disclosure.

The present disclosure further provides in some embodiments a UE, including a processor, a memory, and a computer program stored in the memory and executed by the processor. The processor is configured to execute the computer program, so as to implement the above-mentioned beam measurement processing method with a same technical effect, which will thus not be particularly defined herein.

The present disclosure further provides in some embodiments a computer-readable storage medium storing therein a computer program. The computer program is executed by a processor so as to implement the above-mentioned beam measurement processing method with a same technical effect, which will thus not be particularly defined herein. The computer-readable storage medium may be ROM, RAM, magnetic disk or optical disk.

Figure 20:
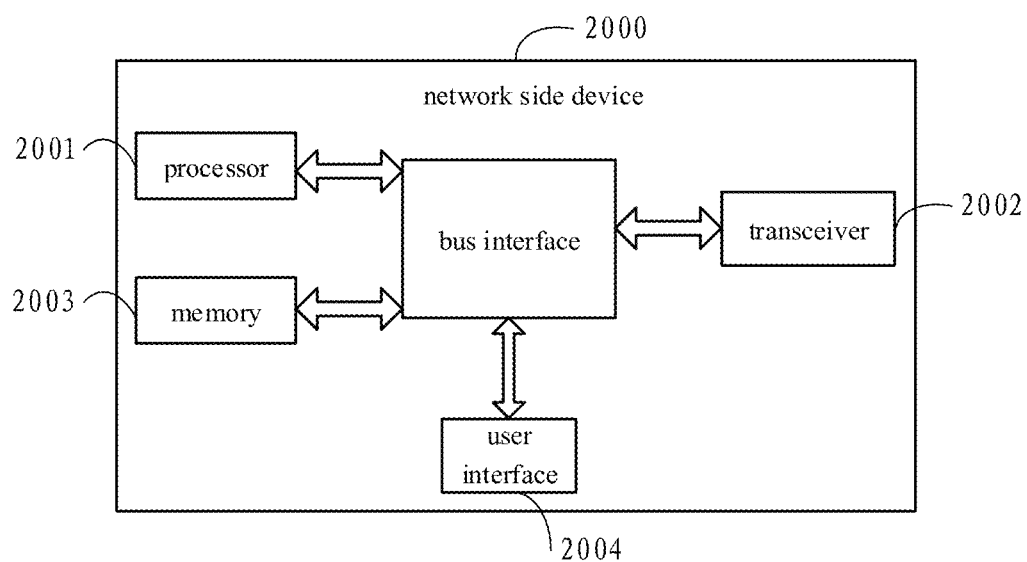
FIG. 20 is a block diagram of a network side device according to one embodiment of the present disclosure.

The present disclosure further provides in some embodiments a network side device capable of implementing the above-mentioned beam measurement processing method with a same technical effect. As shown in FIG. 20, the network side device 2000 includes a processor 2001, a transceiver 2002, a memory 2003, a user interface 2004 and a bus interface. The processor 2001 is configured to read a program stored in the memory 2003. The network side device 200 may further include a computer program stored in the memory 2003 and executed by the processor 2001 so as to: when BPL quality is measured in a first mode, determine a first completion time at which a beam sweeping for all reception beams has been completed by a UE corresponding to a current transmission beam, and transmit a next transmission beam after the first completion time; and/or when the BPL quality is measured in a second mode, determine a second completion time at which a beam sweeping for all transmission beams has been completed by a network side device corresponding to a current reception beam, and perform a next beam sweeping for all the transmission beams after the second completion time.

In FIG. 20, bus architecture may include any number of buses and bridges connected to each other, so as to connect various circuits for one or more processors 2001 and one or more memories 2003. In addition, as is known in the art, the bus architecture may be used to connect any other circuits, such as a circuit for a peripheral device, a circuit for a voltage stabilizer and a power management circuit. The bus interface may be provided, and the transceiver 2002 may consist of a plurality of elements, i.e., a transmitter and a receiver for communication with any other devices over a transmission medium. With respect to different UEs, the user interface 2004 may also be provided for devices which are to be arranged inside or outside the UE, and these devices may include but not limited to a keypad, a display, a speaker, a microphone and a joystick. The processor 2001 may take charge of managing the bus architecture as well as general processings. The memory 2003 may store therein data for the operation of the processor 2001.

In a possible embodiment of the present disclosure, the measuring the BPL quality in the first mode may include: before switching the transmission beam each time, performing the beam sweeping for all the reception beams, and measuring the link quality of each beam pair; and after the completion of the BPL quality measurement, switching to a next transmission beam and performing a next beam sweeping for all the reception beams, until the link quality of all beam pairs formed by each transmission beam and each reception beam has been measured. The measuring the BPL quality in the second mode may include: before switching the reception beam each time, performing the beam sweeping for all the transmission beams, and measuring the link quality of each beam pair; and after the completion of the BPL quality measurement, switching to a next reception beam and performing a next beam sweeping for all the transmission beams, until the link quality of all beam pairs formed by each transmission beam and each reception beam has been measured.

In a possible embodiment of the present disclosure, before the measurement on the BPL quality, the processor 2001 is further configured to execute the computer program, so as to: determine the quantity of the transmission beams and the quantity of the reception beams, and determine a respective transmission beam in accordance with the quantity of the transmission beams; determine symbol partition information in accordance with a maximum quantity of time partition for the UE; and transmit CSI-RS configuration information to the UE, the CSI-RS configuration information being used to indicate the quantity of the transmission beams, the quantity of the reception beams and the symbol partition information. The processor 2001 is further configured to execute the computer program, so as to determine the first completion time at which the beam sweeping for all reception beams has been completed by the UE corresponding to the current transmission beam in accordance with the symbol partition information and the quantity of the reception beams, or determine the second completion time at which the beam sweeping for all transmission beams has been completed by the network side device corresponding to the current reception beam in accordance with the symbol partition information and the quantity of the transmission beams. The maximum quantity of time partition for the UE may be the maximum quantity of time partition for the OFDM symbol capable of being supported by the UE when a predetermined condition is met. The predetermined condition may include that the UE is capable of completing at least one BPL quality measurement within each time partition. The symbol partition information may include the quantity of time partition or a time length of each time partition to be divided within one OFDM symbol.

In a possible embodiment of the present disclosure, the CSI-RS configuration information may include at least one of the symbol partition information, the quantity of the transmission beams, the quantity of the reception beams, CSI-RS resource configuration related information, CSI-RS resource quantity related information, time-domain repetition times associated with each CSI-RS resource, a total quantity of OFDM symbols, a measurement mode indicator, the quantity of symbol intervals, a CSI-RS period, beam selection mode indication information, BPL quality measurement activation information, and the quantity of CSI-RS resources or CSI-RS ports supported within each time partition. The CSI-RS resource configuration related information may include a CSI-RS RE pattern and the quantity of CSI-RS antenna ports.

In a possible embodiment of the present disclosure, the processor 2001 is further configured to execute the computer program, so as to transmit same CSI-RS configuration information to a plurality of UEs, and the maximum quantity of time partition may be a minimum value of the quantities of the maximum quantity of time partition corresponding to the plurality of UEs.

According to the network side device in the embodiments of the present disclosure, after one beam sweeping for all reception beams has been completed, the next transmission beam may be used to transmit, or after one beam sweeping for all transmission beams has been completed, the next beam sweeping for all the transmission beams may be performed. In this regard, after one time unit has been completed and before an ending time of a current OFDM symbol, it is able for the network side device to directly measure the beams within a next time unit with respect to a non-integral multiple of OFDM symbols, without any necessity to wait for the ending of the current OFDM symbol, i.e., without any necessity to meet such a condition that one time unit must occupy an integral multiple of OFDM symbols. As a result, it is able to make full use of a maximum measurement capability of the UE, shorten a time period for the entire beam measurement to the greatest content within the capacity of the UE, and save time resources, thereby to provide more resources for the data transmission.

Figure 21:
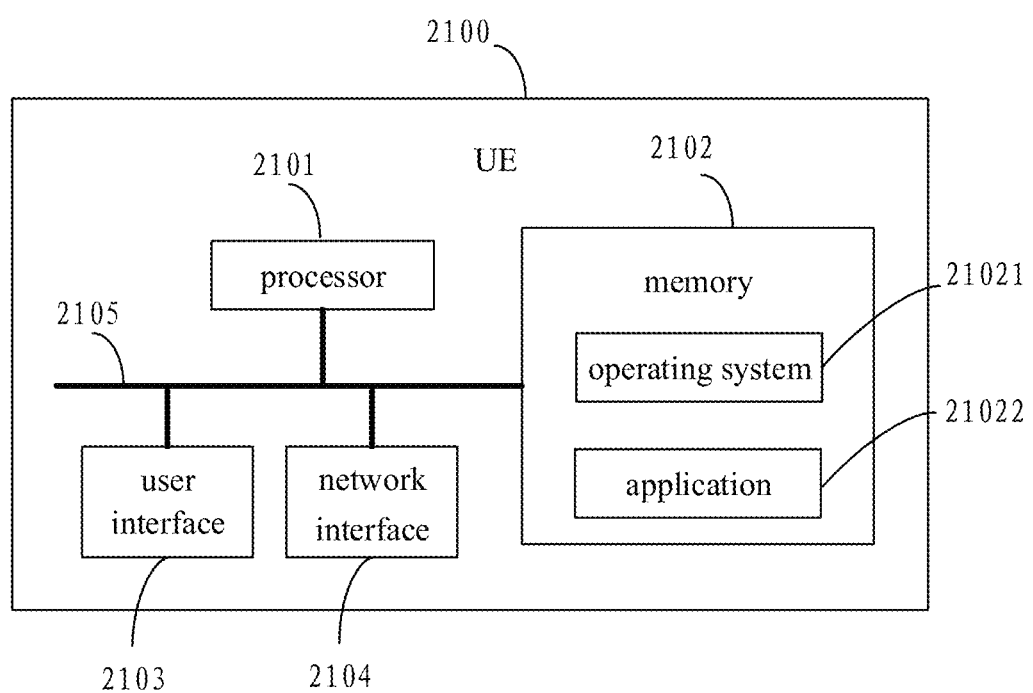
FIG. 21 is a block diagram of a UE according to one embodiment of the present disclosure.

The present disclosure further provides in some embodiments a UE 2100 which, as shown in FIG. 21, includes at least one processor 2101, a memory 2102, at least one network interface 2104 and a user interface 2103. The components of the UE 2100 may be coupled together through a bus system 2105. It should be appreciated that, the bus system 2105 is configured to achieve connection and communication among the components. Apart from a data bus, the bus system 2105 may further include a power source bus, a control bus and a state signal bus. For clarification, all these buses in FIG. 21 may be collectively called as bus system 2105.

The user interface 2103 may include a display, a keyboard or a pointing device (e.g., mouse, track ball, touch plate or touch panel).

It should be appreciated that, the memory 2102 may be a volatile memory, a nonvolatile memory or both. The nonvolatile memory may be an ROM, a Programmable ROM (PROM), an Erasable PROM (EPROM), an electrically EPROM (EEPROM) or a flash memory. The volatile memory may be an RAM which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ES-DRAM), Synchronous Link DRAM (SLDRAM) or Direct Rambus RAM (DRRAM). The memory 2102 intends to include, but not limited to, the above-mentioned and any other appropriate memories.

In a possible embodiment of the present disclosure, the following elements may be stored in the memory 2102: an executable module or data structure, a subset or an extended set thereof, an operating system 21021 and an application 21022.

The operating system 21021 may include various system programs, e.g., a framework layer, a core layer and a driving layer, so as to implement various basic services and process hardware-based tasks. The application 21022 may include various applications, e.g., Media Player and Browser, so as to implement various application services. The programs for implementing the above-mentioned method may be included in the application 21022.

In the embodiments of the present disclosure, the UE 2100 may further include a computer program stored in the memory 2102 and executed by the processor 2101, e.g., a computer program in the application 21022. The processor 2102 is configured to execute the computer program, so as to: when BPL quality is measured in a first mode, determine a first completion time at which a beam sweeping for all reception beams has been completed by the UE corresponding to a current transmission beam, and perform a next beam sweeping for all the reception beams after the first completion time; and/or when the BPL quality is measured in a second mode, determine a second completion time at which a beam sweeping for all transmission beams has been completed by a network side device corresponding to a current reception beam, and measure a next reception beam after the second completion time.

The above-mentioned method may be applied to, or implemented by, the processor 2101. The processor 2101 may be an integrated circuit (IC) having a signal processing capability. During the implementation, the steps of the above-mentioned method may be completed through an integrated logic circuit of hardware in the processor 2101 or instructions in the form of software. The processor 2101 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 2102, and the processor 2101 may read information stored in the memory 2102 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

In a possible embodiment of the present disclosure, the measuring the BPL quality in the first mode may include: before switching the transmission beam each time, performing the beam sweeping for all the reception beams, and measuring the link quality of each beam pair; and after the completion of the BPL quality measurement, switching to a next transmission beam and performing a next beam sweeping for all the reception beams, until the link quality of all beam pairs formed by each transmission beam and each reception beam has been measured. The measuring the BPL quality in the second mode may include: before switching the reception beam each time, performing the beam sweeping for all the transmission beams, and measuring the link quality of each beam pair; and after the completion of the BPL quality measurement, switching to a next reception beam and performing a next beam sweeping for all the transmission beams, until the link quality of all beam pairs formed by each transmission beam and each reception beam has been measured.

In a possible embodiment of the present disclosure, the processor 2101 is further configured to: prior to the measurement of the BPL quality, receive CSI-RS configuration information from the network side device; determine the first completion time at which the beam sweeping for all reception beams has been completed by the UE corresponding to the current transmission beam in accordance with symbol partition information and the quantity of reception beams; and/or determine the second completion time at which the beam sweeping for all transmission beams has been completed by the network side device corresponding to the current reception beam in accordance with the symbol partition information and the quantity of the transmission beams.

The CSI-RS configuration information may be used to indicate the quantity of the transmission beams, the quantity of the reception beams and the symbol partition information. The symbol partition information may be determined in accordance with a maximum quantity of time partition for the UE. The maximum quantity of time partition for the UE may be the maximum quantity of time partition for the OFDM symbol capable of being supported by the UE when a predetermined condition is met. The predetermined condition may include that the UE is capable of completing at least one BPL quality measurement within each time partition. The symbol partition information may include the quantity of time partition or a time length of each time partition to be divided within one OFDM symbol.

In a possible embodiment of the present disclosure, when the CSI-RS configuration information includes the quantity of the transmission beams and the quantity of the reception beams, the processor 2101 is further configured to, before the measurement on the BPL quality, extract the quantity of the transmission beams and the quantity of the reception beams from the CSI-RS configuration information.

In a possible embodiment of the present disclosure, when the CSI-RS configuration information includes time-domain repetition times associated with each CSI-RS resource, one of CSI-RS resource quantity related information and CSI-RS resource configuration related information, and the quantity of first beams, the processor 2101 is further configured to, before the measurement on the BPL quality, calculate the quantity of second beams in accordance with the time-domain repetition times, the one of the CSI-RS resource quantity related information and the CSI-RS resource configuration related information, and the quantity of the first beams. Each first beam may be one of the transmission beam and the reception beam, and each second beam may be the other one of the transmission beam and the reception beam.

In a possible embodiment of the present disclosure, when the CSI-RS configuration information includes the time-domain repetition times associated with each CSI-RS resource and one of the CSI-RS resource quantity related information and the CSI-RS resource configuration related information, the processor 2101 is further configured to: before the measurement on the BPL quality, determine the quantity of reception beams supported by the UE as the quantity of the reception beams; and calculate the quantity of the transmission beams in accordance with the time-domain repetition times associated with each CSI-RS resource, the one of the CSI-RS resource quantity related information and the CSI-RS resource configuration related information, and the quantity of the reception beams.

In a possible embodiment of the present disclosure, when the CSI-RS configuration information includes a total quantity of OFDM symbols, the symbol partition information and the quantity of third beams, the processor 2101 is further configured to, before the measurement on the BPL quality, calculate the quantity of fourth beams in accordance with the total quantity of the OFDM symbols, the symbol partition information and the quantity of the third beams. Each third beam may be one of the reception beam and the transmission beam, and each fourth beam may be the other one of the reception beam and the transmission beam.

In a possible embodiment of the present disclosure, when the CSI-RS configuration information includes the total quantity of the OFDM symbols and the symbol partition information, the processor 2101 is further configured to: before the measurement on the BPL quality, determine the quantity of reception beams supported by the UE as the quantity of the reception beams; and calculate the quantity of the transmission beams in accordance with the total quantity of the OFDM symbols and the symbol partition information.

In a possible embodiment of the present disclosure, when the CSI-RS configuration information includes the quantity of CSI-RS resources or CSI-RS ports supported within each time partition, one of the CSI-RS resource quantity related information and the CSI-RS resource configuration related information, the time-domain repetition times associated with each CSI-RS resource and the quantity of fifth beams, the processor 2101 is further configured to, before the measurement on the BPL quality, calculate the quantity of sixth beams in accordance with the quantity of CSI-RS resources or CSI-RS ports supported within each time partition, the one of the CSI-RS resource quantity related information and the CSI-RS resource configuration related information, the time-domain repetition times associated with each CSI-RS resource and the quantity of the fifth beams. Each fifth beam may be one of the transmission beam and the reception beam, and each sixth beam may be the other one of the transmission beam and the reception beam.

In a possible embodiment of the present disclosure, when the CSI-RS configuration information includes the quantity of CSI-RS resources or CSI-RS ports supported within each time partition, one of the CSI-RS resource quantity related information and the CSI-RS resource configuration related information, and the time-domain repetition times associated with each CSI-RS resource, the processor 2101 is further configured to: before the measurement on the BPL quality, determine the quantity of reception beams supported by the UE as the quantity of the reception beams; and calculate the quantity of the transmission beams in accordance with the quantity of CSI-RS resources or CSI-RS ports supported within each time partition, the one of the CSI-RS resource quantity related information and the CSI-RS resource configuration related information, the time-domain repetition times associated with each CSI-RS resource and the quantity of the reception beams.

In a possible embodiment of the present disclosure, when the CSI-RS configuration information includes the quantity of CSI-RS resources or CSI-RS ports supported within each time partition, the quantity of seventh beams, the total quantity of OFDM symbols and the symbol partition information, the processor 2101 is further configured to, before the measurement on the BPL quality, calculate the quantity of eighth beams in accordance with the quantity of CSI-RS resources or CSI-RS ports supported within each time partition, the quantity of the seventh beams, the total quantity of OFDM symbols and the symbol partition information. Each seventh beam may be one of the reception beam and the transmission beam, and each eighth beam may be the other one of the reception beam and the transmission beam.

In a possible embodiment of the present disclosure, when the CSI-RS configuration information includes the quantity of CSI-RS resources or CSI-RS ports supported within each time partition, the total quantity of OFDM symbols and the symbol partition information, the processor 2101 is further configured to, before the measurement on the BPL quality, take the quantity of reception beams supported by the UE as the quantity of the reception beams, and calculate the quantity of the transmission beams in accordance with the quantity of CSI-RS resources or CSI-RS ports supported within each time partition, the quantity of the reception beams, the total quantity of OFDM symbols and the symbol partition information.

In a possible embodiment of the present disclosure, when the CSI-RS configuration information further includes a measurement mode indicator, the processor 2101 is further configured to, before the measurement on the BPL quality, select a measurement mode for the BPL quality in accordance with the measurement mode indicator. The measurement mode may include the first mode and the second mode.

In a possible embodiment of the present disclosure, when the CSI-RS configuration information further includes BPL quality measurement activation information, the processor 2101 is further configured to perform the measurement on the BPL quality in accordance with the BPL quality measurement activation information, and stop the BPL quality measurement upon the receipt of BPL quality measurement deactivation information from the network side device.

In a possible embodiment of the present disclosure, when the CSI-RS configuration information further includes a CSI-RS period, the processor 2101 is further configured to, during the measurement on the BPL quality, perform the measurement on the BPL quality in accordance with the CSI-RS period.

In a possible embodiment of the present disclosure, when the CSI-RS configuration information further includes the quantity of symbol intervals, the processor 2101 is further configured to, during the measurement on the BPL quality, perform the measurement on the BPL quality within discrete OFDM symbols in accordance with the quantity of the symbol intervals.

In a possible embodiment of the present disclosure, the processor 2101 is further configured to: when the quantity of the reception beams is smaller than the quantity of reception beams supported by the UE, select the reception beams at a same amount as the quantity of the reception beams for the beam measurement; or when the CSI-RS configuration information further includes beam selection mode indication information, select the reception beams at a same amount as the quantity of the reception beams for the beam measurement in accordance with the beam selection mode indication information.

In a possible embodiment of the present disclosure, when selecting the reception beams at a same amount as the quantity of the reception beams for the beam measurement, an optimum reception beam in previous BPL quality measurement and several reception beams adjacent to the optimum reception beam may be selected as target reception beams for the beam measurement; or the optimum reception beam in the previous BPL quality measurement and several reception beams spaced apart from the optimum reception beam at a same interval may be selected as the target reception beams for the beam measurement.

The UE 2100 is capable of implementing the above-mentioned beam measurement processing method, and thus will not be particularly defined herein.

According to the UE in the embodiments of the present disclosure, after one beam sweeping for all reception beams has been completed, the next beam sweeping for all the reception beams may be performed, or after one beam sweeping for all the transmission beams has been completed, a next reception beam may be measured. In this regard, after one time unit has been completed and before an ending time of a current OFDM symbol, it is unnecessary for the UE to wait for the ending of the OFDM symbol, i.e., it is unnecessary to meet such a condition that one time unit must occupy an integral multiple of OFDM symbols. Instead, it is able for the UE to perform the beam measurement directly within a next time unit occupying a non-integral multiple of OFDM symbols. As a result, it is able to make full use of a maximum measurement capability of the UE, shorten a time period for the entire beam measurement to the greatest content within the capacity of the UE, and save time resources, thereby to provide more resources for the data transmission.

The present disclosure further provides in some embodiments a UE, including a processor, a memory, and a computer program stored in the memory and executed by the processor. The processor is configured to execute the computer program, so as to implement the above-mentioned beam measurement processing method with a same technical effect, which will thus not be particularly defined herein.

The present disclosure further provides in some embodiments a computer-readable storage medium storing therein a computer program. The computer program is executed by a processor so as to implement the above-mentioned beam measurement processing method with a same technical effect, which will thus not be particularly defined herein. The computer-readable storage medium may be ROM, RAM, magnetic disk or optical disk.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at a same position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A beam measurement processing method for a network side device, comprising:
    determining a first completion time at which beam sweeping for all reception beams has been completed by a User Equipment (UE) corresponding to a current transmission beam when measuring Beam Pair Link (BPL) quality in a first mode, and transmitting a next transmission beam after the first completion time; and/or
    determining a second completion time at which beam sweeping for all transmission beams has been completed by the network side device corresponding to a current reception beam when measuring the BPL quality in a second mode, and performing a next beam sweeping for all transmission beams after the second completion time;
    wherein before the measurement on the BPL quality, the beam measurement processing method further comprises: determining symbol partition information in accordance with a maximum quantity of time partition for the UE;
    wherein the determining the first completion time at which the beam sweeping for all reception beams has been completed by the UE corresponding to the current transmission beam comprises determining the first completion time at which the beam sweeping for all reception beams has been completed by the UE corresponding to the current transmission beam in accordance with the symbol partition information and a quantity of the reception beams, wherein the determining the second completion time at which the beam sweeping for all transmission beams has been completed by the network side device corresponding to the current reception beam comprises determining the second completion time at which the beam sweeping for all transmission beams has been completed by the network side device corresponding to the current reception beam in accordance with the symbol partition information and a quantity of the transmission beams, wherein the maximum quantity of time partition is the maximum quantity of time partition for an Orthogonal Frequency Division Multiplexing (OFDM) symbol supported by the UE when a predetermined condition is met, the predetermined condition comprises that the UE is capable of completing at least one BPL quality measurement within each time partition, and the symbol partition information comprises the quantity of time partition or a time length of each time partition to be divided within one OFDM symbol.

2. The beam measurement processing method according to claim 1, wherein the measuring the BPL quality in the first mode comprises:

before switching the transmission beam each time, performing the beam sweeping for all reception beams, and measuring the link quality of each beam pair formed by the beam sweeping; and after the completion of the BPL quality measurement, switching to a next transmission beam and performing a next beam sweeping for all reception beams, until the link quality of all beam pairs formed by each transmission beam and each reception beam has been measured, wherein the measuring the BPL quality in the second mode comprises:

before switching the reception beam each time, performing the beam sweeping for all transmission beams, and measuring the link quality of each beam pair formed by the beam sweeping; and after the completion of the BPL quality measurement, switching to a next reception beam and performing a next beam sweeping for all transmission beams, until the link quality of all beam pairs formed by each transmission beam and each reception beam has been measured.

3. The beam measurement processing method according to claim 2, wherein before the measurement on the BPL quality, the beam measurement processing method further comprises:

determining the quantity of the transmission beams and the quantity of the reception beams, and determining respective transmission beams in accordance with the quantity of the transmission beams; and transmitting Channel State Information Reference Signal (CSI-RS) configuration information to the UE, the CSI-RS configuration information being used to indicate the quantity of the transmission beams, the quantity of the reception beams and the symbol partition information.

4. The beam measurement processing method according to claim 3, wherein the CSI-RS configuration information comprises at least one of the symbol partition information, the quantity of the transmission beams, the quantity of the reception beams, CSI-RS resource configuration related information, CSI-RS resource quantity related information, time-domain repetition times associated with each CSI-RS resource, a total quantity of OFDM symbols, a measurement mode indicator, the quantity of symbol intervals, a CSI-RS period, beam selection mode indication information, BPL quality measurement activation information, and the quantity of CSI-RS resources or CSI-RS ports supported within each time partition, wherein the CSI-RS resource configuration related information comprises a CSI-RS RE pattern and the quantity of CSI-RS antenna ports.

5. The beam measurement processing method according to claim 3, wherein the transmitting the CSI-RS configuration information to the UE comprises transmitting same CSI-RS configuration information to a plurality of UEs, and the maximum quantity of time partition is a minimum value of the quantities of the maximum quantity of time partition corresponding to the plurality of UEs.

6. A network side device, comprising a processor, a memory, and a computer program stored in the memory and executed by the processor, wherein the processor is configured to execute the computer program so as to implement the beam measurement processing method according to claim 1.

7. A beam measurement processing method for a user equipment (UE), comprising:

determining a first completion time at which beam sweeping for all reception beams has been completed by a UE corresponding to a current transmission beam when BPL quality is measured in a first mode, and performing a next beam sweeping for all reception beams after the first completion time; and/or determining a second completion time at which beam sweeping for all transmission beams has been completed by a network side device corresponding to a current reception beam when the BPL quality is measured in a second mode, and switching to a next reception beam for measurement after the second completion time;

wherein the determining the first completion time at which the beam sweeping for all reception beams has been completed by the UE corresponding to the current transmission beam comprises determining the first completion time at which the beam sweeping for all reception beams has been completed by the UE corresponding to the current transmission beam in accordance with symbol partition information and a quantity of the reception beams, wherein the determining the second completion time at which the beam sweeping for all transmission beams has been completed by the network side device corresponding to the current reception beam comprises determining the second completion time at which the beam sweeping for all transmission beams has been completed by the network side device corresponding to the current reception beam in accordance with the symbol partition information and a quantity of the transmission beams, wherein the symbol partition information is determined in accordance with a maximum quantity of time partition for the UE, the maximum quantity of time partition for the UE is the maximum quantity of time partition for the OFDM symbol capable of being supported by the UE when a predetermined condition is met, the predetermined condition comprises that the UE is capable of completing at least one BPL quality measurement within each time partition, and the symbol partition information comprises the quantity of time partition or a time length of each time partition to be divided within one OFDM symbol.

8. The beam measurement processing method according to claim 7,
wherein the measuring the BPL quality in the first mode comprises:
before switching the transmission beam each time, performing the beam sweeping for all reception beams, and measuring the link quality of each beam pair formed by the beam sweeping; and
after the completion of the BPL quality measurement, switching to a next transmission beam and performing a next beam sweeping for all reception beams, until the link quality of all beam pairs formed by each transmission beam and each reception beam has been measured,
wherein the measuring the BPL quality in the second mode comprises:
before switching the reception beam each time, performing the beam sweeping for all transmission beams, and measuring the link quality of each beam pair formed by the beam sweeping; and
after the completion of the BPL quality measurement, switching to a next reception beam and performing a next beam sweeping for all transmission beams, until the link quality of all beam pairs formed by each transmission beam and each reception beam has been measured.

9. The beam measurement processing method according to claim 8, wherein before the measurement on the BPL quality, the beam measurement processing method further comprises receiving CSI-RS configuration information from the network side device,
wherein the CSI-RS configuration information is used to indicate the quantity of the transmission beams, the quantity of the reception beams and the symbol partition information.

10. The beam measurement processing method according to claim 9, wherein when the CSI-RS configuration information comprises the quantity of the transmission beams and the quantity of the reception beams, the beam measurement processing method further comprises, before the measurement on the BPL quality, extracting the quantity of the transmission beams and the quantity of the reception beams from the CSI-RS configuration information.

11. The beam measurement processing method according to claim 9, wherein when the CSI-RS configuration information comprises time-domain repetition times associated with each CSI-RS resource, one of CSI-RS resource quantity related information and CSI-RS resource configuration related information, and the quantity of first beams, the beam measurement processing method further comprises:
before the measurement on the BPL quality, calculating the quantity of second beams in accordance with the time-domain repetition times, the one of the CSI-RS resource quantity related information and the CSI-RS resource configuration related information, and the quantity of the first beams,
wherein each first beam is one of the transmission beam and the reception beam, and each second beam is the other one of the transmission beam and the reception beam.

12. The beam measurement processing method according to claim 9, wherein when the CSI-RS configuration information comprises the time-domain repetition times associated with each CSI-RS resource and one of the CSI-RS resource quantity related information and the CSI-RS resource configuration related information, the beam measurement processing method further comprises:
before the measurement on the BPL quality, determining the quantity of reception beams supported by the UE as the quantity of the reception beams; and
calculating the quantity of the transmission beams in accordance with the time-domain repetition times associated with each CSI-RS resource, the one of the CSI-RS resource quantity related information and the CSI-RS resource configuration related information, and the quantity of the reception beams.

13. The beam measurement processing method according to claim 9, wherein when the CSI-RS configuration information comprises a total quantity of OFDM symbols, the symbol partition information and the quantity of third beams, the beam measurement processing method further comprises:
before the measurement on the BPL quality, calculating the quantity of fourth beams in accordance with the total quantity of the OFDM symbols, the symbol partition information and the quantity of the third beams,
wherein each third beam is one of the reception beam and the transmission beam, and each fourth beam is the other one of the reception beam and the transmission beam.

14. The beam measurement processing method according to claim 9, wherein when the CSI-RS configuration information comprises the total quantity of the OFDM symbols and the symbol partition information, the beam measurement processing method further comprises:
before the measurement on the BPL quality, determining the quantity of reception beams supported by the UE as the quantity of the reception beams; and
calculating the quantity of the transmission beams in accordance with the total quantity of the OFDM symbols and the symbol partition information.

15. The beam measurement processing method according to claim 9, wherein when the CSI-RS configuration information comprises the quantity of CSI-RS resources or CSI-RS ports supported within each time partition, one of the CSI-RS resource quantity related information and the CSI-RS resource configuration related information, the time-domain repetition times associated with each CSI-RS resource and the quantity of fifth beams, the beam measurement processing method further comprises:
before the measurement on the BPL quality, calculating the quantity of sixth beams in accordance with the quantity of CSI-RS resources or CSI-RS ports supported within each time partition, the one of the CSI-RS resource quantity related information and the CSI-RS resource configuration related information, the time-domain repetition times associated with each CSI-RS resource and the quantity of the fifth beams,
wherein each fifth beam is one of the transmission beam and the reception beam, and each sixth beam is the other one of the transmission beam and the reception beam.

16. The beam measurement processing method according to claim 9, wherein when the CSI-RS configuration information comprises the quantity of CSI-RS resources or CSI-RS ports supported within each time partition, one of the CSI-RS resource quantity related information and the CSI-RS resource configuration related information, and the time-domain repetition times associated with each CSI-RS resource, the beam measurement processing method further comprises:
before the measurement on the BPL quality, determining the quantity of reception beams supported by the UE as the quantity of the reception beams; and calculating the quantity of the transmission beams in accordance with the quantity of CSI-RS resources or CSI-RS ports supported within each time partition, the one of the CSI-RS resource quantity related information and the CSI-RS resource configuration related information, the time-domain repetition times associated with each CSI-RS resource and the quantity of the reception beams.

17. The beam measurement processing method according to claim 9, wherein when the CSI-RS configuration information comprises the quantity of CSI-RS resources or CSI-RS ports supported within each time partition, the quantity of seventh beams, the total quantity of OFDM symbols and the symbol partition information, the beam measurement processing method further comprises:

before the measurement on the BPL quality, calculating the quantity of eighth beams in accordance with the quantity of CSI-RS resources or CSI-RS ports supported within each time partition, the quantity of the seventh beams, the total quantity of OFDM symbols and the symbol partition information, wherein each seventh beam is one of the reception beam and the transmission beam, and each eighth beam is the other one of the reception beam and the transmission beam.

18. The beam measurement processing method according to claim 9, wherein when the CSI-RS configuration information comprises the quantity of CSI-RS resources or CSI-RS ports supported within each time partition, the total quantity of OFDM symbols and the symbol partition information, the beam measurement processing method further comprises:

before the measurement on the BPL quality, taking the quantity of reception beams supported by the UE as the quantity of the reception beams, and calculating the quantity of the transmission beams in accordance with the quantity of CSI-RS resources or CSI-RS ports supported within each time partition, the quantity of the reception beams, the total quantity of OFDM symbols and the symbol partition information.

19. The beam measurement processing method according to claim 9, wherein when the CSI-RS configuration information further comprises a measurement mode indicator, the beam measurement processing method further comprises:

before the measurement on the BPL quality, selecting a measurement mode for the BPL quality in accordance with the measurement mode indicator, wherein the measurement mode comprises the first mode and the second mode.

20. A UE, comprising a processor, a memory, and a computer program stored in the memory and executed by the processor, wherein the processor is configured to execute the computer program so as to implement the beam measurement processing method according to claim 7.

* * * * *